United States Patent
Atta et al.

(10) Patent No.: US 9,850,389 B1
(45) Date of Patent: Dec. 26, 2017

(54) SYNTHESIS OF BIMETALLIC OXIDE NANOCOMPOSITES USING POLY (IONIC LIQUID)

(71) Applicant: KING SAUD UNIVERSITY, Riyadh (SA)

(72) Inventors: Ayman M. Atta, Cairo (EG); Hamad A. Al-Lohedan, Riyadh (SA); Abdelrahman O. Ezzat, Mansoura (EG); Mahmood M. S. Abdullah, Taez (YE)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 15/466,597

(22) Filed: Mar. 22, 2017

(51) Int. Cl.
*C09D 7/02* (2006.01)
*C09D 7/12* (2006.01)
(Continued)

(52) U.S. Cl.
CPC ............. *C09D 7/1216* (2013.01); *B05D 1/02* (2013.01); *B05D 3/007* (2013.01); *C01G 49/0018* (2013.01); *C09D 7/1266* (2013.01); *C09D 7/1275* (2013.01); *C09D 7/1291* (2013.01); *C09D 163/00* (2013.01); *C08K 3/22* (2013.01);
(Continued)

(58) Field of Classification Search
CPC .. C09D 7/1216; C09D 163/00; C09D 7/1266; C09D 7/1275; C09D 7/1291; C01G 49/0018; B05D 1/02; B05D 3/007; C08K 7/18; C08K 2003/2275; C08K 3/22; C08K 2003/2248
See application file for complete search history.

(56) References Cited

U.S. PATENT DOCUMENTS 7,645,436 B1   1/2010 Ryang
2012/0296012 A1   11/2012 Palmese et al.

FOREIGN PATENT DOCUMENTS

CN         105973971 A   *   9/2016
WO    WO 2014/060891 A2       4/2014

OTHER PUBLICATIONS

Liang, Xiaoliang, et al. "The application of chromium substituted magnetite as heterogeneous Fenton catalyst for the degradation of aqueous cationic and anionic dyes." Chemical Engineering Journal 191 (2012): 177-184.*

(Continued)

*Primary Examiner* — Richard M Pump
(74) *Attorney, Agent, or Firm* — Richard C. Litman

(57) ABSTRACT

A method of synthesizing bimetallic oxide nanocomposites includes the steps of: providing a first metal salt solution; adding an oxidizing agent to the first metal salt solution while degassing the solution with an inert gas; heating the first metal salt solution; adding a second metal salt solution to the heated first metal salt solution to form a reaction mixture; adding a solution comprising a poly (ionic liquid) into the reaction mixture; adding a first base into the reaction mixture; adding a second base while stirring and maintaining a temperature ranging from about 40° C. to about 65° C. to provide a solution including a bimetallic oxide nanocomposite precipitate. The first metallic salt solution can include $FeCl_3$ dissolved in water. The second metallic salt solution can include $CuCl_2$ dissolved in water. The bimetallic oxide nanocomposites can be combined with epoxy resin to coat a steel stubstrate.

6 Claims, 21 Drawing Sheets

(51) Int. Cl.
- *B05D 1/02* (2006.01)
- *B05D 3/00* (2006.01)
- *C09D 163/00* (2006.01)
- *C01G 49/00* (2006.01)
- *C08K 7/18* (2006.01)
- *C08K 3/22* (2006.01)

(52) U.S. Cl.
CPC ........ *C08K 7/18* (2013.01); *C08K 2003/2248* (2013.01); *C08K 2003/2275* (2013.01)

(56) References Cited

OTHER PUBLICATIONS

Song, Pei, et al. "Poly (ionic liquid) assisted synthesis of hierarchical gold-platinum alloy nanodendrites with high electrocatalytic properties for ethylene glycol oxidation and oxygen reduction reactions." International Journal of Hydrogen Energy 41.32 (2016): 14058-14067.*

* cited by examiner

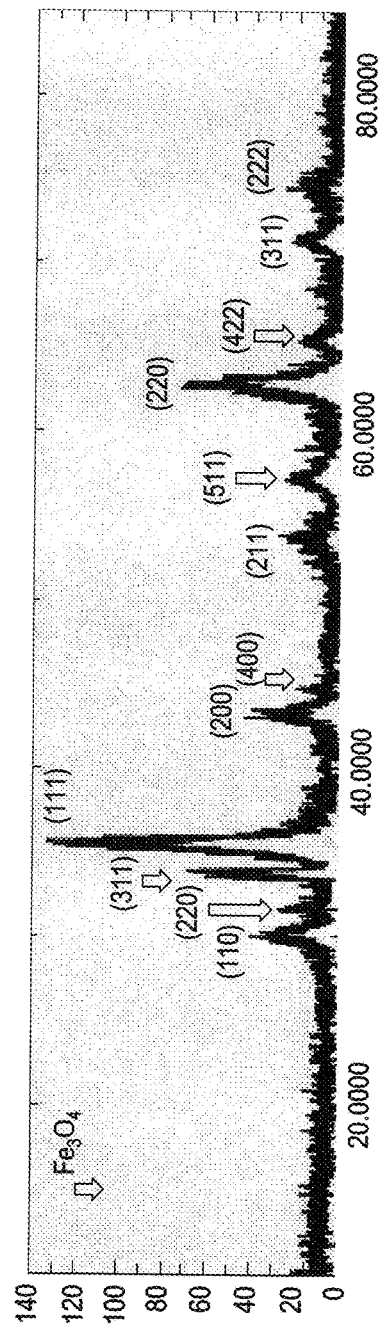
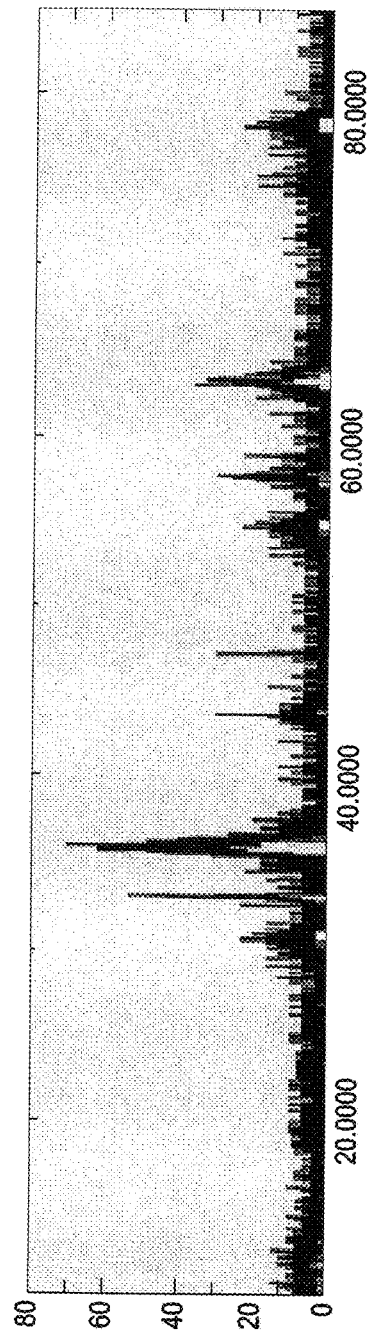
FIG. 8A
FIG. 8B

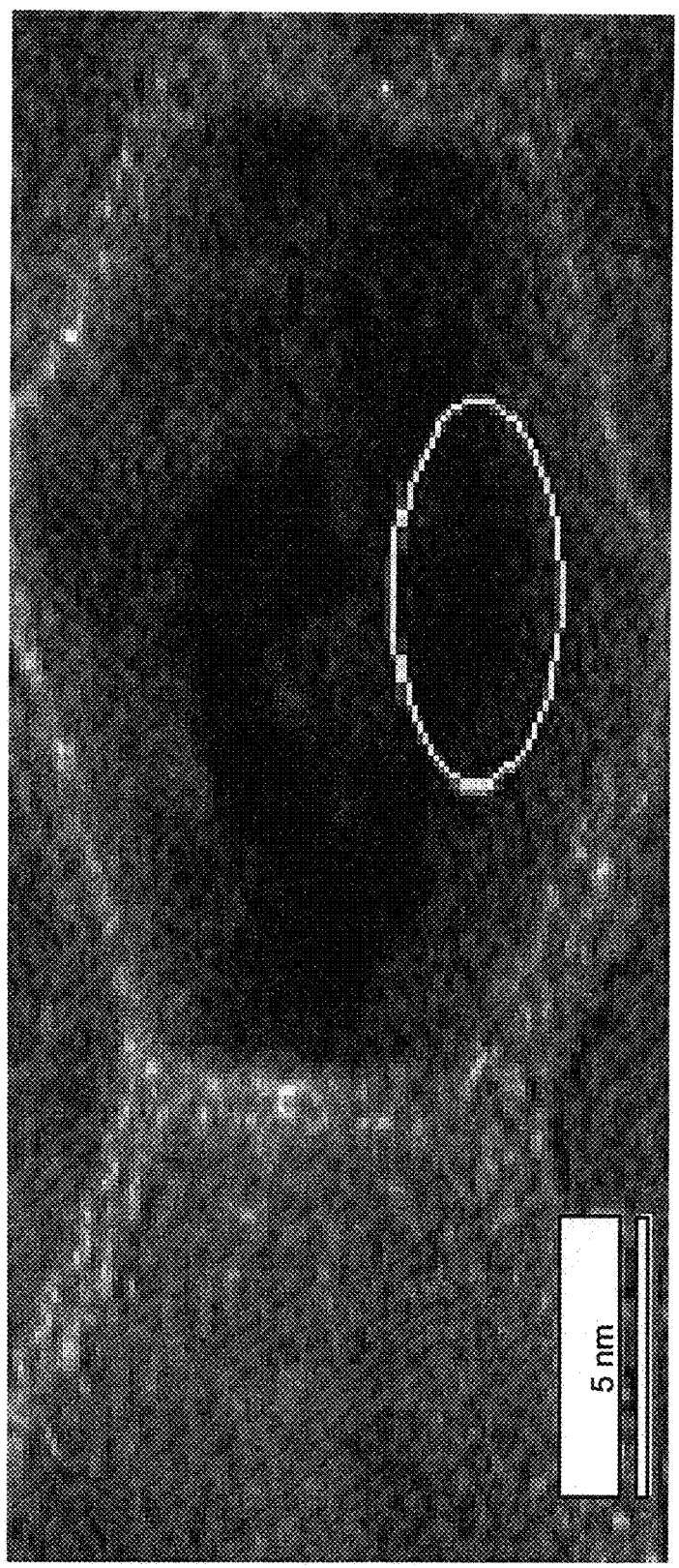

SYNTHESIS OF BIMETALLIC OXIDE NANOCOMPOSITES USING POLY (IONIC LIQUID)

BACKGROUND OF THE INVENTION

1. Field of the Invention

The present invention relates to bio-nanotechnology and, particularly, to the synthesis of $Cu_2O.2Fe_3O_4$ nanocomposites capped with poly(ionic liquid) for use as highly dispersed fillers.

2. Description of the Related Art

Epoxy resins are commonly used as organic coatings to protect steel from corrosion. Epoxy resins are excellent corrosion inhibitors and demonstrate good adhesion for steel substrates. Drawbacks of conventional epoxy coatings, however, include the appearance of microcracks, holes, low thermal and fire retardant stability, and toughness.

Thus, a method of synthesizing nanocomposites utilizing poly (ionic liquid) solving the aforementioned problems is desired.

SUMMARY OF THE INVENTION

A method of synthesizing bimetallic oxide nanocomposites includes the steps of: providing a first metal salt solution; adding an oxidizing agent to the first metal salt solution while degassing the solution with an inert gas; heating the first metal salt solution; adding a second metal salt solution to the heated first metal salt solution to form a reaction mixture; adding a solution comprising a poly (ionic liquid) into the reaction mixture; adding a first base into the reaction mixture; adding a second base while stirring and maintaining a temperature ranging from about 40° C. to about 65° C. to provide a solution including a bimetallic oxide nanocomposite precipitate. The first metallic salt solution can include $FeCl_3$ dissolved in water. The second metallic salt solution can include $CuCl_2$ dissolved in water. The oxidizing agent can be sodium sulfite ($Na_2SO_3$). The bimetallic oxide nanocomposite can be $Cu_2O.2Fe_3O_4$. The bimetallic oxide nanocomposites can be combined with epoxy resin to coat a steel stubstrate.

These and other features of the present invention will become readily apparent upon further review of the following specification and drawings.

BRIEF DESCRIPTION OF THE DRAWINGS

FIG. 8A shows the XRD diffractogram of $Cu_2O.2Fe_3O_4$ (Example 2)

FIG. 8B shows the XRD diffractogram of $Cu_2O.2Fe_3O_4$ (Example 3).

FIGS. 11A and 11C show the HRTEM micrographs of $Cu_2O.2Fe_3O_4$ (Example 2).

Similar reference characters denote corresponding features consistently throughout the attached drawings.

DETAILED DESCRIPTION OF THE PREFERRED EMBODIMENTS

Figure 1:
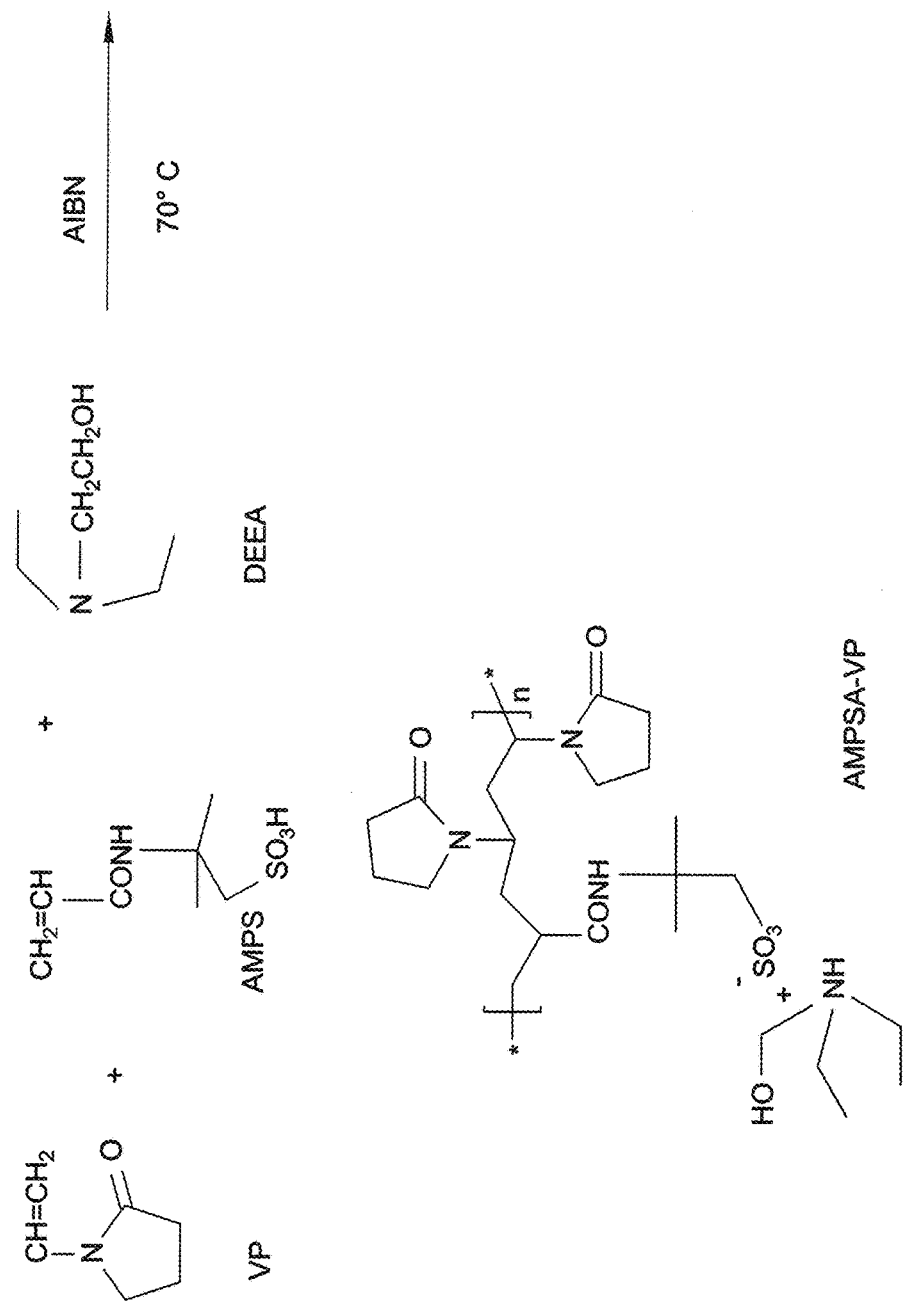
FIG. 1 is a schematic showing the synthesis of polyionic liquid based on AMPSA-VP.

A method of synthesizing bimetallic oxide nanocomposites includes the steps of: providing a first metal salt solution; adding an oxidizing agent to the first metal salt solution while degassing the solution with an inert gas; heating the first metal salt solution to a temperature ranging from about 40° C. to about 65° C.; adding a second metal salt solution to the heated first metal salt solution to form a reaction mixture; adding a solution comprising a poly (ionic liquid) into the reaction mixture; adding a first base dropwise into the reaction mixture for about 1 hour; adding a second base while stirring and maintaining a temperature between 40° C. to 65° C. for at least 2 hours to provide a solution including a bimetallic oxide nanocomposite precipitate. The first metallic salt solution can include $FeCl_3$ dissolved in water. The second metallic salt solution can include $CuCl_2$ dissolved in water. The oxidizing agent can be sodium sulfite ($Na_2SO_3$). The bimetallic oxide nanocomposite can be $Cu_2O.2Fe_3O_4$. The first base can be sodium hydroxide and the second base can be ammonium hydroxide. The bimetallic oxide nanocomposites can be combined with epoxy resin to coat a steel stubstrate.

The poly (ionic liquid) can include poly (2-acrylamido-2-methyl-1-propanesulfonic acid-diethyl ethanolamine (PAMPS-DEA), 2-acrylamido-2-methyl-1-propanesulfonic acid-N-isopropyl acrylamide (AMPS-NIPAm), 2-acrylamido-2-methyl-1-propanesulfonic acid-vinyl pyrrolidone (AMPS-VP), or 2-acrylamido-2-methyl-1-propanesulfonic acid-acrylic acid (AMPS-AA).

The poly (ionic liquid) can be prepared by combining an ionic liquid monomer and a co-monomer to obtain a mixture; adding a free radical initiator to the mixture and heating the mixture up to a temperature of about 70° C.; cooling the reaction mixture to obtain a polymeric ionic liquid product; dissolving the polymeric ionic liquid product in a first organic solvent to form a solution and precipitating out a solid or an oily polymeric ionic liquid product by adding the solution to a second organic solvent; and isolating the solid or the oily polymeric ionic liquid product by filtration. The synthesis process can be conducted in an inert atmosphere, for example, in nitrogen or argon. The first solvent and the second solvent can each include at least one of acetone, ethanol, and diethyl ether. The ionic liquid monomer can be 2-acrylamido-2-methyl-1-propanesulfonic acid (AMPS) or a salt thereof. The co-monomer can include at least one of diethyl ethanolamine (DEEA), N-vinyl pyrrolidone (VP), acrylic acid (AA), and N-isopropyl acrylamide (NIPAm). The free radical initiator can be 2, 2-azobisisobutyronitrile, or any other suitable initiator.

The method of synthesizing bimetallic oxide nanocomposites can further include the steps of separating the precipitate by centrifuging at 15000 rpm for about 10 minutes to isolate the bimetallic oxide nanocomposites; and washing the bimetallic oxide nanocomposites with distilled water.

The bimetallic oxide nanocomposites can have a mean diameter in the range of from about 1 nm to about 350 and a surface that is capped with a poly (ionic liquid). The bimetallic oxide nanocomposites can include particles of 10 nm-30 nm size belonging to the $Fe_3O_4$ nanospheres and particles of 35 nm-300 nm belonging to rhombic dodecahedral $Cu_2O$.

The method of using a bimetallic oxide nanocomposite to coat a substrate includes the steps of combining the bimetallic oxide nanocomposites with a prepolymer and a hardener under ultrasonic conditions for about 30 minutes to form a homogenous mixture; spraying the mixture onto a clean substrate surface to provide a uniform layer; and curing the uniform layer for about 1 week at a temperature of about 40° C. to coat the bimetallic oxide nanocomposite on the substrate. The substrate can be a steel plate. The prepolymer can be epoxy resin and the hardener can be a polyamide or polyamine polymer. A weight ratio of the bimetallic oxide nanocomposite can be from about 0.1 percent by weight to about 0.5 percent by weight of the hardener and the polymer In some embodiments, the nanoparticles disclosed herein are from about 1 nm to about 250 nm in diameter, preferably about 1-50 nm. "Nanocomposites" are materials that incorporate nanosized particles that are less than 100 nm in size into a matrix of standard material, such as a polymer matrix. "Poly (ionic liquids)," PILs, are a macromolecular architecture of functional materials based on ionic liquid (IL) monomers connected through a polymeric backbone. The modification of PIL characteristics (density, viscosity, and surface tension) are of great importance for their application.

The present methods provide $Cu_2O.2Fe_3O_4$ nanocomposites or $Cu_2O$ doped on iron oxide nanoparticles ($Fe_3O_4$) capped by modified poly(ionic liquid) in one step to control their dispersion in aqueous and epoxy coatings, to produce new highly dispersed fillers having multi-purposes, and to improve epoxy coatings performances of varied materials for diverse application requirements. The presence of copper-based frame sheets can improve the interfacial fracture toughness of epoxy. Moreover, the doping of $Cu_2O$ with $Fe_3O_4$ can improve the fire retardancy of epoxy resins and increase adhesion of epoxy with steel substrate.

The present technology, thus generally described, will be understood more readily by reference to the following examples, which is provided by way of illustration and is not intended to limit the scope of the present technology.

The following materials were used as received. 2-Acrylamido-2-methyl-1-propanesulfonic acid (AMPS), N-isopropyl acrylamide (NIPAm), acrylonitrile (AN), N-vinyl pyrrolidone (VP), acrylic acid (AA) and acrylamide (AM), hydroxyl amine monomers were obtained from Sigma-Aldrich Chemical Co. and used as received. Ammonium persulfate (APS) and 2,2-azobisisobutyronitrile (AIBN) were used as crosslinker and radical initiators, respectively. Anhydrous ferric chloride, sodium sulfite, cupric chloride ($CuCl_2.2H_2O$) and sodium hydroxide were used to prepare $Cu_2O.2Fe_3O_4$ composites. Diethyl ethanolamine (DEEA) was purchased from Sigma Aldrich Chemicals Co.

Example 1

Synthesis of Poly(Ionic Liquid) (PIL)

Equal molar ratios of AMPS and DEEA were mixed into a nitrogen purged 50 ml flask at room temperature to dissolve AMPS for 8 hr to produce transparent light amber oil. AIBN (0.6 wt. % related to AMPS monomer) was added to the reaction mixture and the reaction temperature was increased up to 70° C. for 18 hr. The reaction mixture cooled to room temperature to produce transparent dark amber mixture. The product was dissolved in ethanol with concentration of 20 Wt. % and precipitated into 5 folds of acetone and filtrated under vacuum. The wax white product was dried under vacuum to obtain transparent amber oil with % yield polymer 98.2% and melting temperature 42° C. The produced polymer was designated as PAMPS-DEA.

A mixture of equal molar ratios (1:1 mol %) of AMPS and VP, NIPAm or AA (6 mmol of each monomer) was stirred with 6 mmol of DEEA under nitrogen atmosphere at 10° C. in flask. The mixing was carried out for 5 hrs to complete dissolution of AMPS in VP and DEEA solutions. Transparent solution was obtained with yield of 99%, indicating the formation of quaternized DEEA organic salt with VP and AMPS monomers. ABIN initiator (0.08 mmol) was added to the reaction mixture under nitrogen bubbling and the mixture was heated to 70° C. for 24 hrs. The viscosity of mixture was increased and transparent light yellow mixture was precipitated from acetone into cold diethyl ether (dry ice/acetone bath) and collected after filtration. The viscous oil was dried under vacuum at 40° C. to remove any residual volatile materials to obtain AMPSA/VP, AMPSA/NPAm or AMPSA/AA polymer with high yield (98.7%).

Example 2

Synthesis of $Cu_2O.2Fe_3O_4$ Nanocomposites $FeCl_3$ (13.4 g-23 g) was dissolved with 100 mL distilled water, and charged into a 500 mL three-necked flask. The solution of 5-75 mL of $Na_2SO_3$ (4.8 wt. %-14.5 wt. %) was added to the reaction mixture followed by bubbling with $N_2$ and stirring for 1 h. The reaction mixture was heated at temperature ranged from 40° C. to 65° C. The $CuCl_2.2H_2O$ (1.75-7.4 g) was dissolved in 50 mL water was added to the reaction mixture, The solution of (1-2 M) of NaOH 100 mL in water was added dropwise to the reaction mixture during 1 h. The ammonium hydroxide (4-8 g) dissolved in 50 mL aqueous solution was added to the reaction mixture was added at the same time with solution of (1-2 M) of NaOH 100 mL in water and at temperatures ranging from about 40° C. to about 65° C. for 2-10 h. The suspended brownish black solution was centrifuged at 15000 rpm for 10 min. The precipitate obtained was washed several times with distilled water to remove the NaCl and other salts from the solvent. The $Cu_2O.2Fe_3O_4$ nanoparticles were dispersed in distilled water, and adjusted (pH 2) with 2 mol/L HCl for further experiment. The yield percentage of the reaction ranged from 85% to 95%.

Example 3

Synthesis of $Cu_2O.2Fe_3O_4$ Nanocomposites $FeCl_3$ (13.4-23 g) was dissolved with 100 mL distilled water, and charged into a 500 mL three-necked flask. The solution of 5-75 mL of $Na_2SO_3$ (4.8-14.5 wt. %) was added to the reaction mixture followed by bubbling with $N_2$ and stirring for 1 h. The reaction mixture was heated at temperature ranged from 40 to 65° C. The $CuCl_2.2H_2O$ (1.75-7.4 g) was dissolved in 50 mL water was added to the reaction mixture. The PAMPS-DEA, AMPSA/VP, AMPSA/NPAm or AMPSA/AA polymer (2-8 g) was dissolved in 50 ml and added to the reaction mixture. The solution of (1-2 M) of NaOH 100 mL in water was added dropwise to the reaction mixture during 1 h. The ammonium hydroxide (4-8 g) dissolved in 50 mL aqueous solution was added to the reaction mixture at the same time with solution of (1-2 M) of NaOH 100 mL in water at temperatures ranging from about 40° C. to 65° C. for 2-10 h. The suspended brownish black solution was centrifuged at 15000 rpm for 10 min. The precipitate obtained was washed several times with distilled water to remove the NaCl, and other salts from the solvent. The $Cu_2O.2Fe_3O_4$ nanoparticles were dispersed in distilled water, and adjusted (pH 2) with 2 mol/L HCl for further experiment. The yield percentage of the reaction ranged from 96 to 99%.

The chemical structure of the PAMPS-DEA was confirmed by $^1H$- and $^{13}CNMR$ analyses that were recorded on a 400 MHz Bruker Avance DRX-400 spectrometer. The surface morphology of the nanogels was observed by (SEM) (JEOL DCA-840A) instrument at 20 kV. A few droplets of the diluted suspension were dropped on to a cover glass and then dried under vacuum at room temperature for 24 hours. Samples were coated with gold vapor prior to observation. The morphology of nanogels was observed under Transmission Electron Microscope (TEM, JEOL JEM-2100 F) electron microscope. High resolution HR-TEM images recorded an acceleration voltage of 200 kv. The TEM sample was prepared by placing a dilute drop of aqueous particles onto the copper grids and allowing it to dry.

The analysis was performed using a Bruker D2 Phaser X-ray powder diffractometer (30 kV, 10 mA) using Cu anode (k=0.15406 nm) at 250 C. The patterns were collected in the 2 [theta] range of 4-700 with step size of 0.020 and scan rate of 1 s.

Zeta potentials were determined using Laser Zeta meter Malvern Instruments (Model Zetasizer 2000) in aqueous solution in the presence of KCl (0.01 M) at different pH solutions.

The thermal stability and nanogel contents of nanogel composites were evaluated using thermogravimetric analysis (TGA; TGA-50 SHIMADZU at flow rate 50 ml/min and heating rate of 20° C./min).

The dispersion stability, polydispersity index (PDI) and surface charges (zeta potential; mV) of nanogel composites were determined by using dynamic light scattering (DLS; Laser Zeta meter Malvern Instruments; Model Zetasizer 2000). UV-Vis spectrophotometer (UV-2450, Shimadzu, Kyoto, Japan) was used to confirm the formation of nanocomposites at wave lengths ranged from 200 to 700 nm.

Example 4

Preparation of $Cu_2O.2Fe_3O_4$ Epoxy Nanocomposite Coatings $Cu_2O.2Fe_3O_4$ nanocomposites prepared using the methods described in Example 2 or 3 were blended with epoxy resins at weight percentages ranging from 0.1 to 5 wt. % based on total weight of epoxy and hardener under sonication for 30 minutes. The dispersed $Cu_2O.2Fe_3O_4$ epoxy composites were mixed with polyamide hardener under vigorous stirring according to the recommended volume ratios resin/hardener (4/1). The mixtures were sprayed on blasted and cleaned steel panels to obtain dry film thickness (DFT) of 100 μm and cured for 1 week at temperature 40° C. to be sure the all epoxy films were cured.

Tests of the coated epoxy nanocomposite films were performed as follows. The blasting of steel panels, mechanical tests such as T-bending, impact resistance, hardness and pull-off adhesion test were carried out according standard methods ASTM. The adhesion pull-off test was determined using a hydraulic pull-off adhesion tester in the range of 0-25 MPa. The hardness was determined by using Erichsen hardness test pencil, model 318S, scratching force in the range of 0.5-20 N. The abrasion resistance was evaluated according ASTM D4060-07 by applying 5000 cycles with 1000 g load on the tested panels. A salt spray cabinet (manufactured by CW Specialist equipment ltd. model SF/450) was used to evaluate the salt spray resistance of coated panels. The tests were carried out for cured epoxy nanocomposite films in the presence or absence of $Cu_2O.2Fe_3O_4$ nanocomposites on steel panels. ASTM B117 was used to investigate salt spray tests.

The flammability of the sample was measured by an FTT cone calorimeter instrument (U.K.) under heat flux of 35 kW/m2 according to ISO 5660-1. The size of specimen was $100 \times 10^3$ mm$^3$.

The quaternization of DEA with AMPS polymers succeeded to prepare new PILs. PAMPSA was prepared and showed excellent thermal stability and surface active properties for use as super filler for epoxy coatings with multifunctional purposes, e.g., to protect carbon steel. In the present invention, AMPS is selected to prepare copolymers with VP monomer that has great efficacy to act as stabilizing, capping and reducing agent when converted to poly(vinyl pyrrolidone), PVP, at the same time to prepare controlled shapes and sizes of nanomaterials. Moreover, the reactivity ratios data between AMPS and VP confirmed that the alternate copolymers were prepared during the copolymerization of AMPS and VP. The scheme of copolymerization of quaternized EDA with AMPS/VP copolymers is represented in FIG. 1. It is expected that the AMPSA/VP can be used as capping for formation of $Cu_2O.2Fe_3O_4$ nanoparticles at room temperature to increase their wetting and adsorption characteristics at different interfaces.

The mechanism for preparing the $Cu2O.Fe_3O_4$ in the presence of NaOH and $NH_2OH$ can be represented in the following equations:

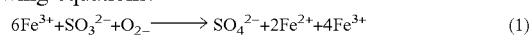

$$6Fe^{3+} + SO_3^{2-} + O_2^- \longrightarrow SO_4^{2-} + 2Fe^{2+} + 4Fe^{3+} \quad (1)$$

$$2Fe^{2+} + 4Fe^{3+} + 18OH^- \longrightarrow 2Fe_3O_4 + 9H_2O \quad (2)$$

$$2Cu^{2+} + NH_2OH \longrightarrow 2Cu^+ + (NHOH) + 2H^+ \quad (3)$$

$$(NHOH) + \tfrac{1}{2}O_2 \longrightarrow NO_2^- + H^+ \quad (4)$$

$$2Cu^+ + 2OH^- \longrightarrow Cu_2O + H_2O \quad (5)$$

$$6FeCl_3 + 2CuCl_2 + Na_2SO_3 + 23NaOH + NH_2OH + \tfrac{1}{2}O_2$$
$$\longrightarrow Cu_2O.2Fe_3O_4 + Na_2SO_4 + NaNO_2 + 22NaCl + 13H_2O \quad (6)$$

These equations represent the oxidation reduction reactions to convert the ferric chloride and cupric chloride salt to produce $Cu_2O.2Fe_3O_4$ composites.

One of the most important goals of the present work is to use poly (ionic liquid) PIL as reducing and capping agents to produce silver nanoparticles with controlled shape and size. For this purpose, VP is used as co-monomer with AMPSA (FIG. 1) to produce PIL having greater tendency to reduce silver metal ions to metal nanoparticles. Moreover the presence of DEEA in the chemical structure of AMPSA/VP assists in reduction of silver ions to silver metal due to the presence of hydroxyl group. In the present work, AMPSA/VP was used to produce $Cu_2O.2Fe_3O_4$ in a simple one-step method. It is postulated that the PIL surrounded the cuprous, ferric and ferrous cations into a flexible network by polar interactions between cations and negative anions of AMPSA/VP chains to produce stable hydrosol. It is expected that there are two possible mechanisms to illustrate the reduction step: direct hydrogen abstraction of PIL of VP backbone induced by the cations and/or reducing action of VP macroradical formations.

Figure 3:
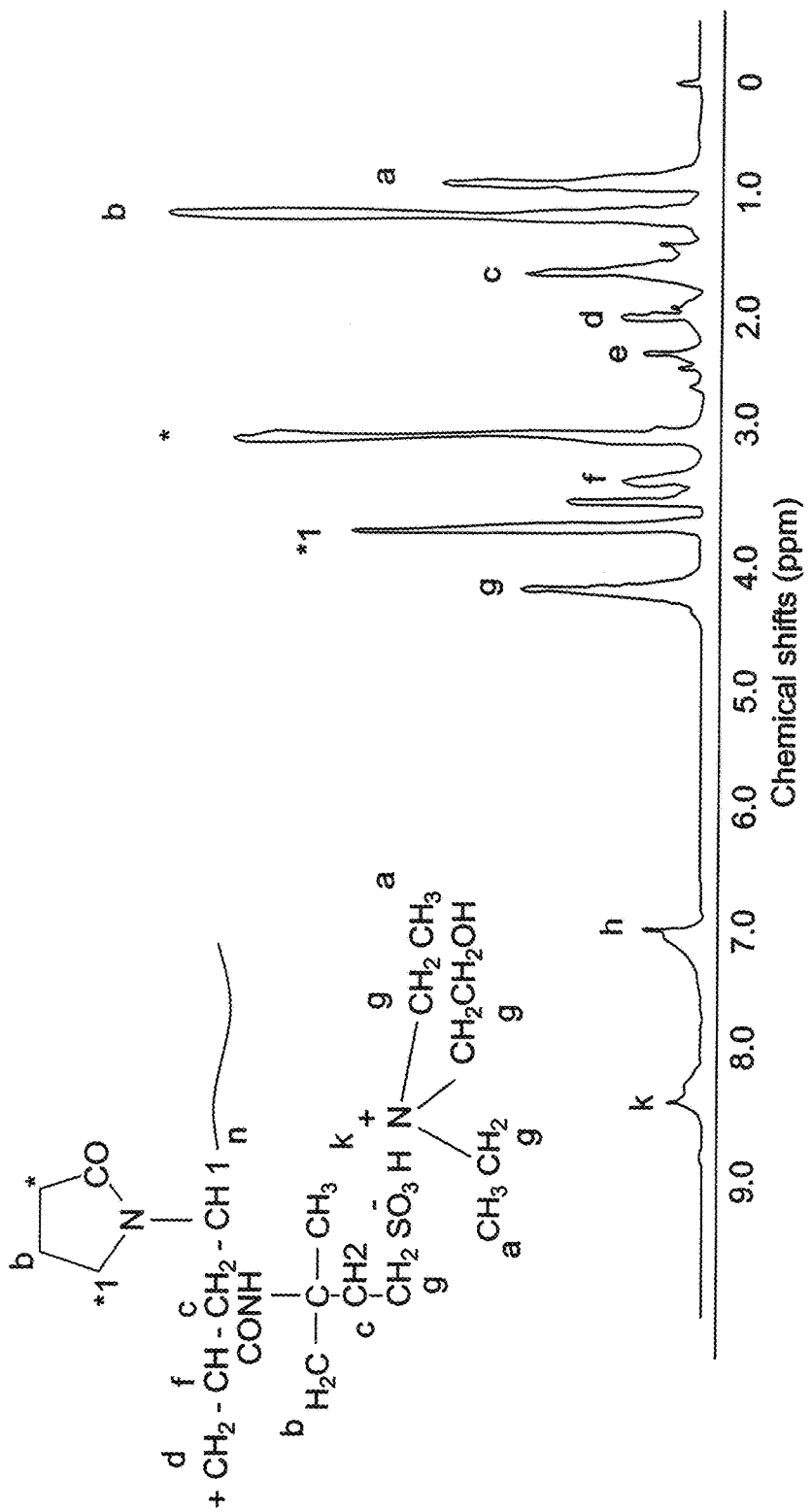
FIG. 3 shows the $^1HNMR$ spectra of (a) AMPSA/AAm, (b) AMPSA/MAA and (c) AMPSA/MAA.
Figure 4:
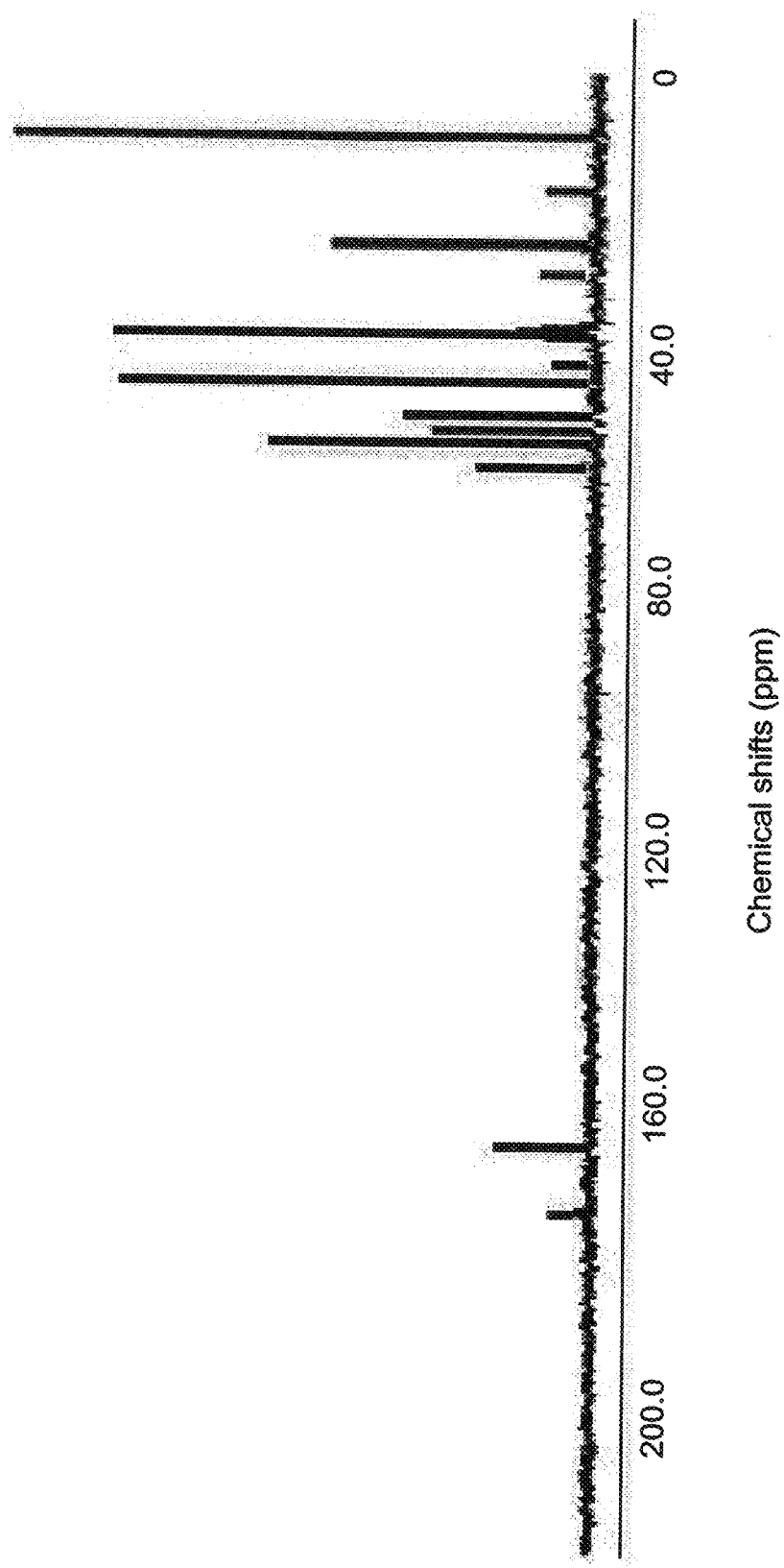
FIG. 4 shows the $^{13}C$ NMR spectra of a) AMPSA/AAm, b) AMPSA/MAA and c) AMPSA/MAA.

The chemical structures of the prepared PILs PAMPSA and PAMPSA/VP are confirmed from $^1H$ and $^{13}C$ NMR spectra as presented in FIGS. 3 and 4. The protons of PAMPSA were elucidated from previous works and confirmed on the chemical structure of PAMPSA/VP (FIG. 3). The disappearance of HC= peaks at chemical shifts from 5.1 to 6.4 ppm elucidates the copolymerization of AMPSA/VP copolymer. The appearance of a broad peak at 8.3 ppm elucidates the de-shield proton of quaternize amine groups of DEA with AMPS sulfonate group (FIG. 3). The presence of new peaks at 3.1 and 3.7 ppm (attributed to methylene groups of VP) confirms the copolymerization of VP to form AMPSA/VP without degradation or hydrolysis by sulfonate group of AMPS.

The $^{13}C$ NMR spectrum was also used to confirm the copolymerization of AMPSA with VP as represented in FIG. 4. The disappearance of peaks at chemical shifts from 110 to 130 ppm, C=C, elucidates the polymerization of PAMPSA and PAMPSA/VP. The presence of peaks at δ 168.58 (CON), 77.3 (C—O of DEA), 60.06 (C—N$^+$), 58.13 (C—SO$_3^-$), 40.3 (C—SO$_3^-$) 26.84 (CH) and 10 ppm (CH$_3$) elucidates the polymerization and quaternization of PAMPSA and PAMPSA/VP.

Figure 2:
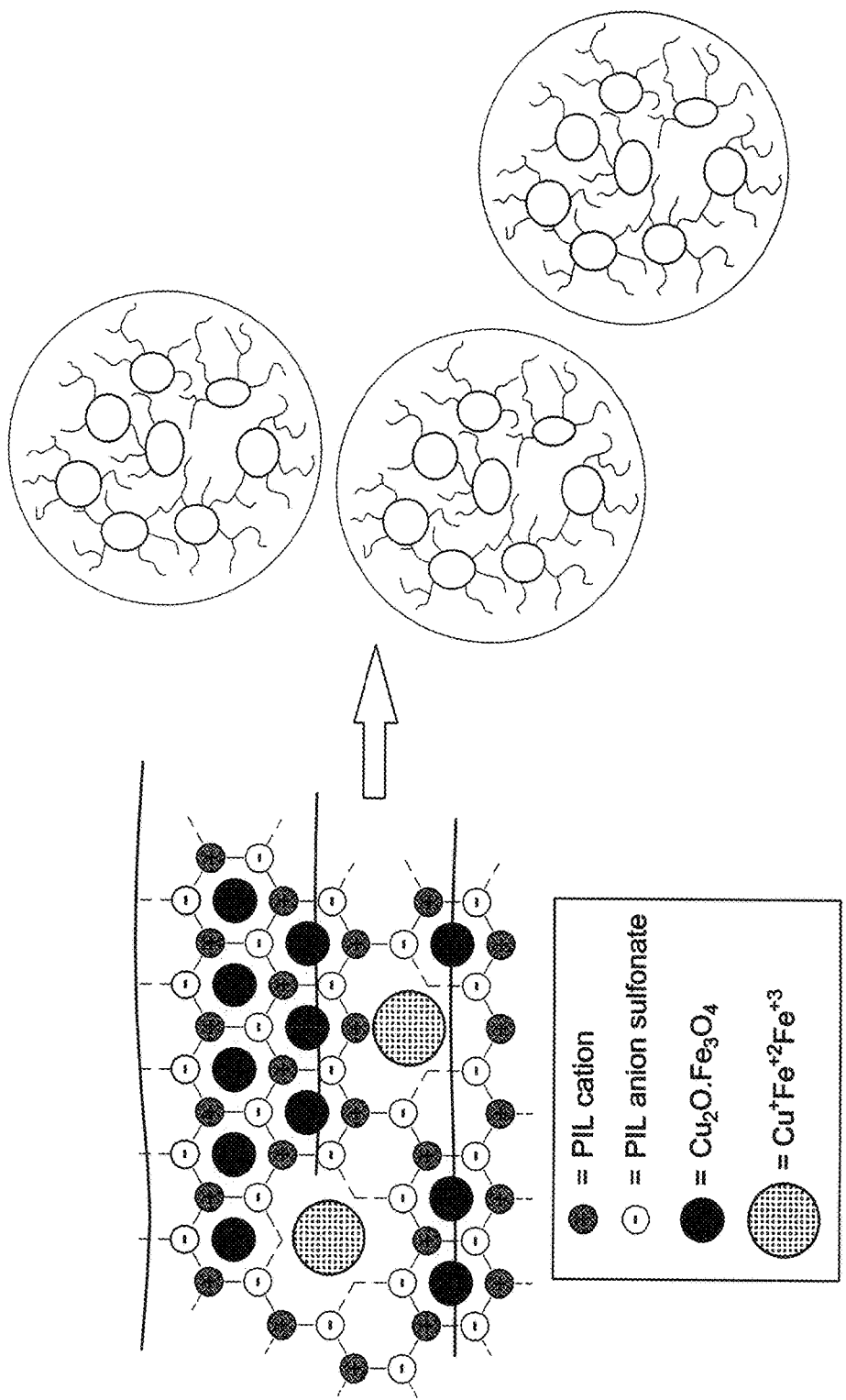
FIG. 2 is a schematic showing the synthesis of $Cu_2O.Fe_3O4$ in the presence of AMPSA-VP2.
Figure 5A:
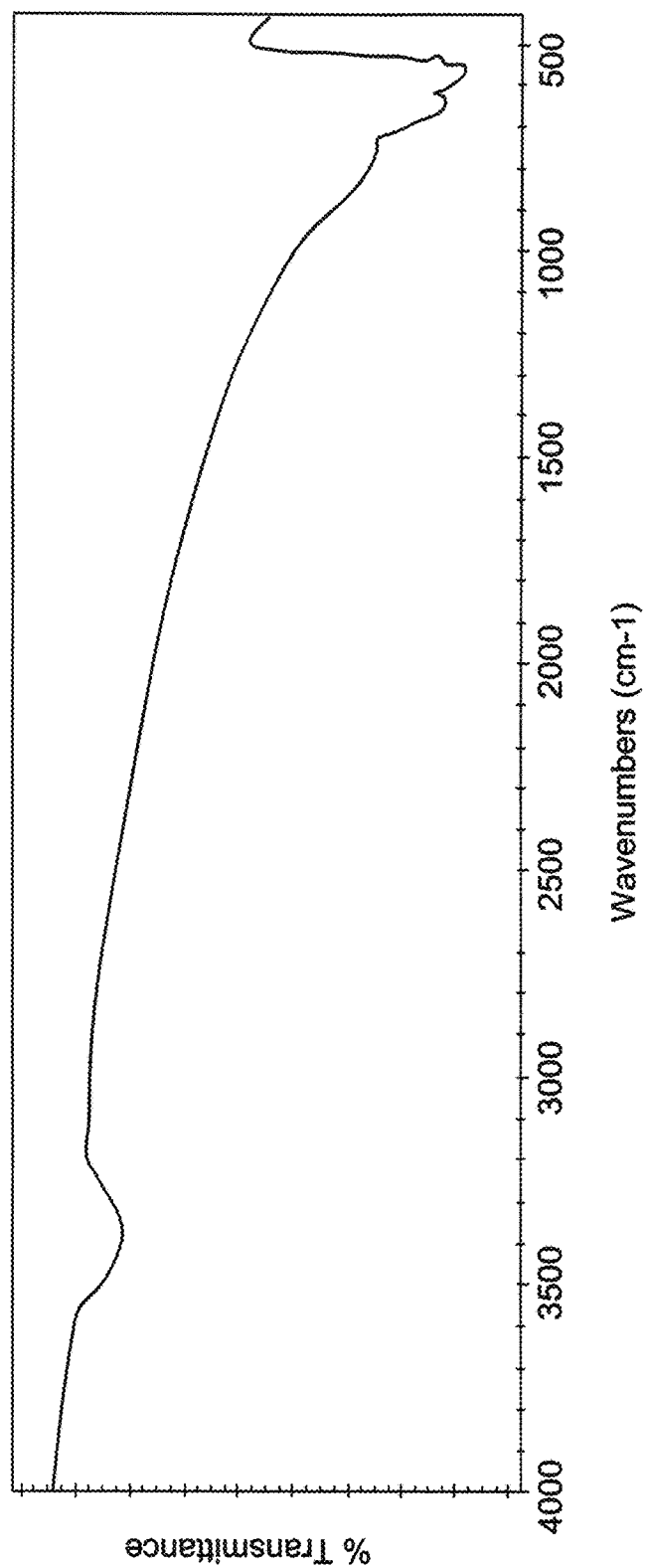
FIG. 5A shows the FTIR spectra of $Cu_2O.2Fe_3O_4$ (Example 2)
Figure 5B:
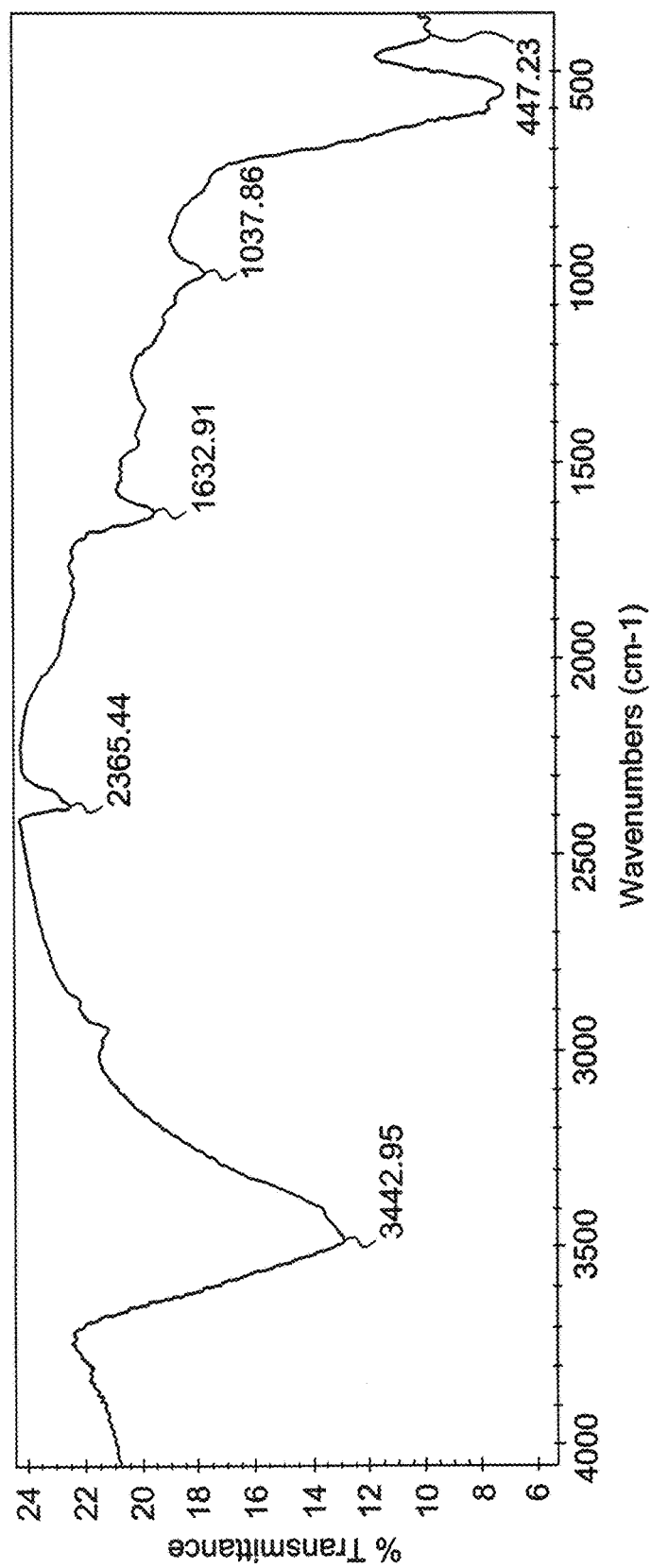
FIG. 5B shows the FTIR spectra of $Cu_2O.2Fe_3O_4$ (Example 3)

The $Cu_2O.2Fe_3O_4$ nanocomposites were characterized as follows. The chemical structures of the $Cu_2O.2Fe_3O_4$ composites prepared in absence of PIL (Example 2) and in the presence of PIL (Example 3) were determined by FTIR and are represented in FIGS. 5A and 5B, respectively. The presence of $Fe_3O_4$ and $Cu_2O$ was elucidated by appearance of absorption bands at 580 and 626 cm$^{-1}$ respectively, which are ascribed to Fe—O and Cu—O bond vibration. The appearance of organic functional groups of PIL at 3442, 1632 and 1037 cm$^{-1}$, attributed to OH, CONH and C—O stretching of PIL, in the spectrum of $Cu_2O.2Fe_3O_4$ composites prepared in PIL (Example 3; FIG. 5B) confirms the encapsulation of composite into PIL as proposed in FIG. 2.

Figure 6:
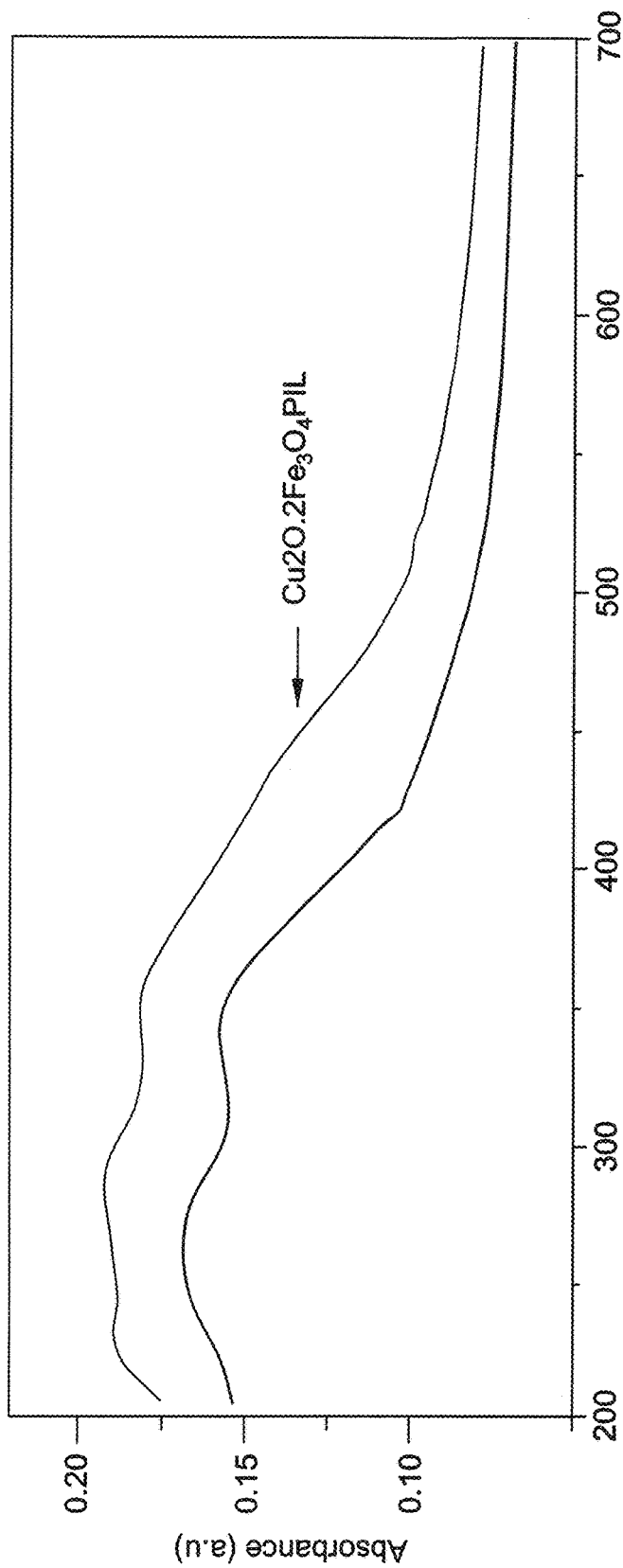
FIG. 6 shows the UV-visible spectra of $Cu_2O.2Fe_3O_4$ nanocomposites.

The formation of $Cu_2O.2Fe_3O_4$ nanoparticles with or without AMPSA/VP can be elucidated from UV-visible spectrum represented in FIG. 6. The $Cu_2O.2Fe_3O_4$ nanocomposites have absorption in the whole UV-visible region ranging from 200 nm to 700 nm. The formation of plasmon elucidates that magnetite was not formed separately but was doped with $Cu_2O$ during a short time elucidates the ability of AMPSA/VP to act as effective reducing and capping agent at temperature of 50° C.

Figure 7:
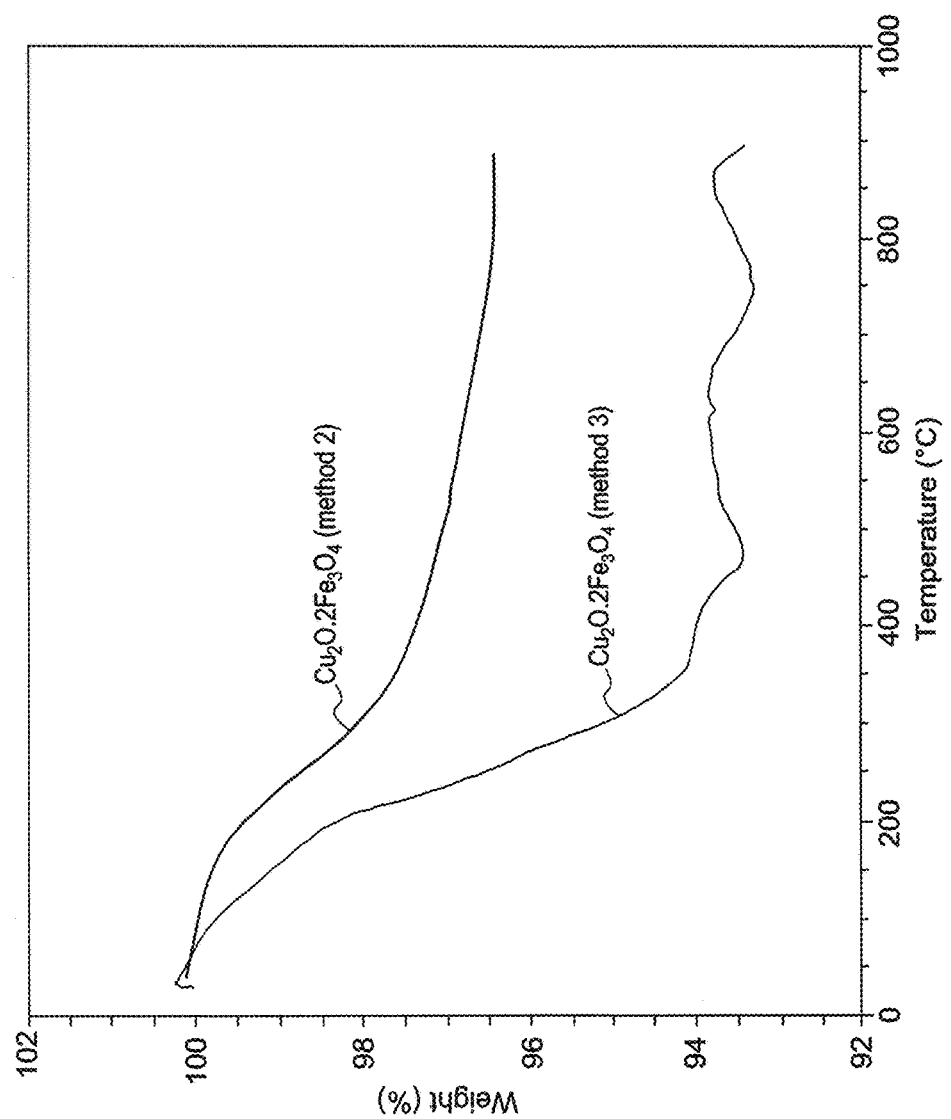
FIG. 7 shows the TGA thermograms of $Cu_2O.2Fe_3O_4$ nanocomposites.

The thermal stability of $Cu_2O.2Fe_3O_4$ nanocomposites and the content of AMPSA/VP can be determined from the TGA thermograms represented in FIG. 7. The data confirmed that there is approximately 3.8 wt. % of bound water and hydroxyl groups formed at the Cu2O.2Fe3O4 surfaces which lost at temperature ranging from 25 to 150° C. The contents of AMPSA/VP are determined as 4 wt. % that lost at temperatures ranging from 350 to 420° C. The data also confirmed the high thermal stability of $Cu_2O.2Fe_3O_4$ nanocomposites.

The crystal structure of $Cu_2O.2Fe_3O_4$ nanocomposites can be determined from XRD patterns as represented in FIG. 8. Seven major reflections located at about 30.1°, 35.5°, 43.2°, 53.5°, 57.1°, 62.6° and 74.3° shown in FIG. 8A can be assigned to diffraction of $Fe_3O_4$ nanoparticles with cubic-phase from the (220), (311), (400), (422), (511), (440) and (533) planes (JCPDS card No. 65-3107), respectively. The peaks at 2θ values of 36.5°, 42.4° and 61.4°, are clearly distinguishable and can be perfectly indexed rhombic dodecahedral crystals in the cubic-phase from the (1 1 0), (1 1 1), (2 0 0), (2 1 1), (2 2 0), (3 1 1) and (2 2 2) planes (JCPDS card No. 05-0667). These peaks correspond to the crystal planes of (111), (200) and (220) of the $Cu_2O$, respectively. These peaks suggest that $Cu_2O.2Fe_3O_4$ nanocomposites are formed. XRD pattern of the $Cu_2O.2Fe_3O_4$ nanocomposites reveals that the crystal structure of $Fe_3O_4$ is well-maintained after loading by Cu2O during the reaction process. It was clear that the intensity of the Cu2O peaks became gradually stronger with the presence of AMPSA/VP during of the formation of $Cu_2O.2Fe_3O_4$ nanocomposites (Example 3). On the other hand, it was notable that there was a slight positive shift for the diffraction peaks (3 1 1), (2 0 0), (5 1 1), (2 2 0), (3 1 1) at approximately 35.5, 43.2, 57.1, 61.5, 77.6, indicating that there was an interaction between $Cu_2O$ and $Fe_3O_4$. The low intensity and broadness of peaks for $Cu_2O.2Fe_3O_4$ nanocomposites prepared in the presence of AMPSA/VP (FIG. 8B; Example 3) elucidate the low particle sizes of Cu2O.2Fe3O4 nanocomposites more than that prepared in the absence of AMPSA/VP (FIG. 8A; Example 2).

Figure 9A:
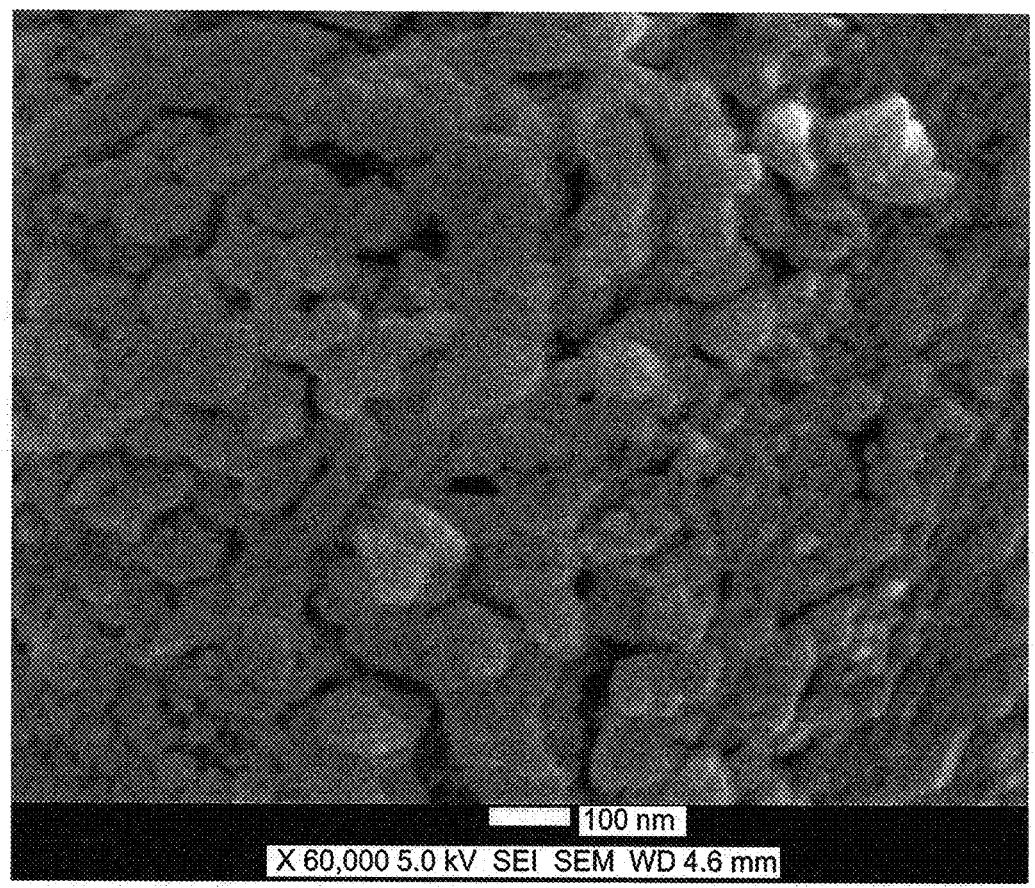
FIG. 9A shows the SEM micrograph of $Cu_2O.2Fe_3O_4$ (Example 2).
Figure 9B:
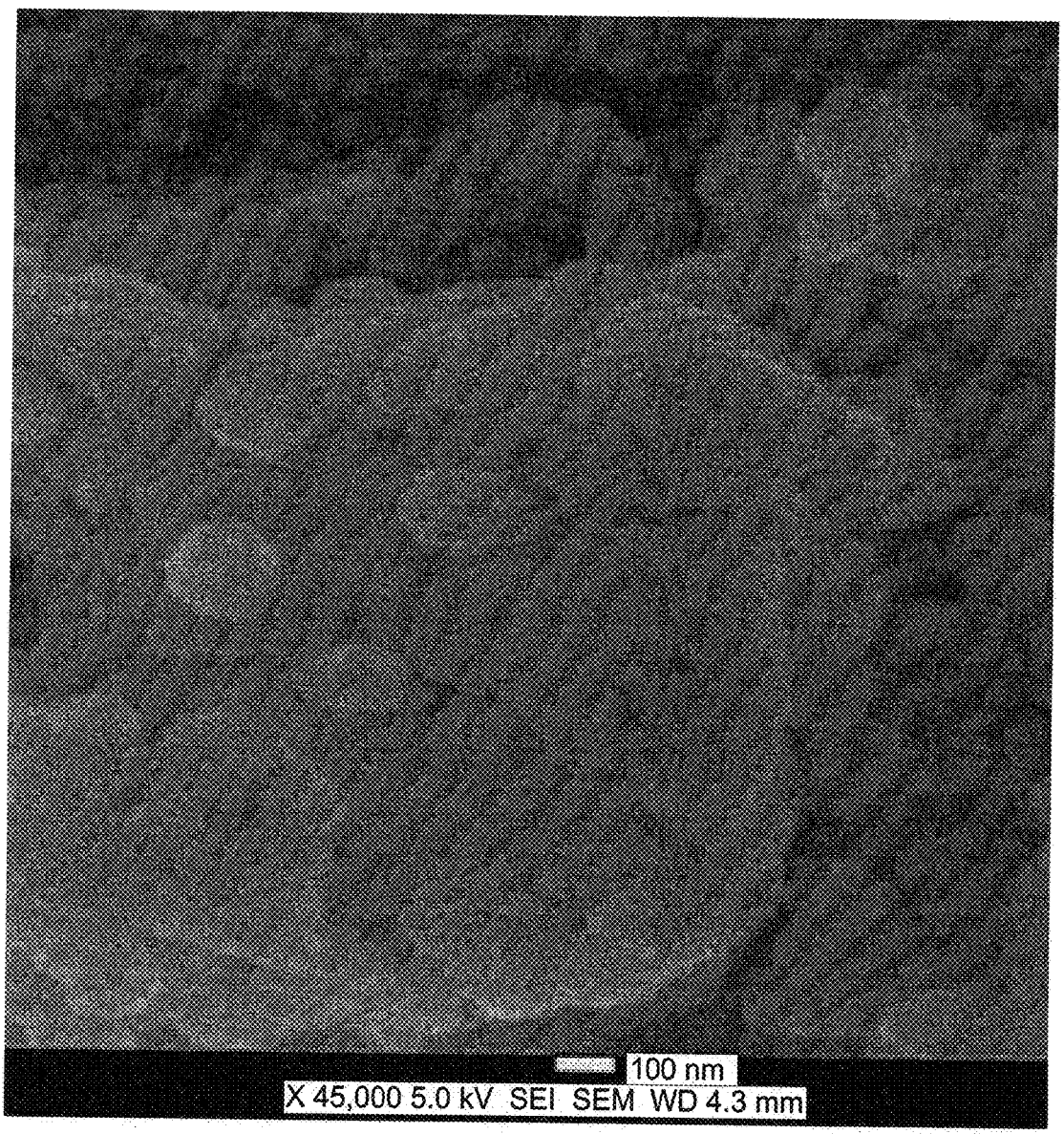
FIG. 9B shows the SEM micrograph of $Cu_2O.2Fe_3O_4$ (Example 3).
Figure 10A:
FIG. 10A shows the TEM micrograph of $Cu_2O.2Fe_3O_4$ (Example 2).
Figure 10B:
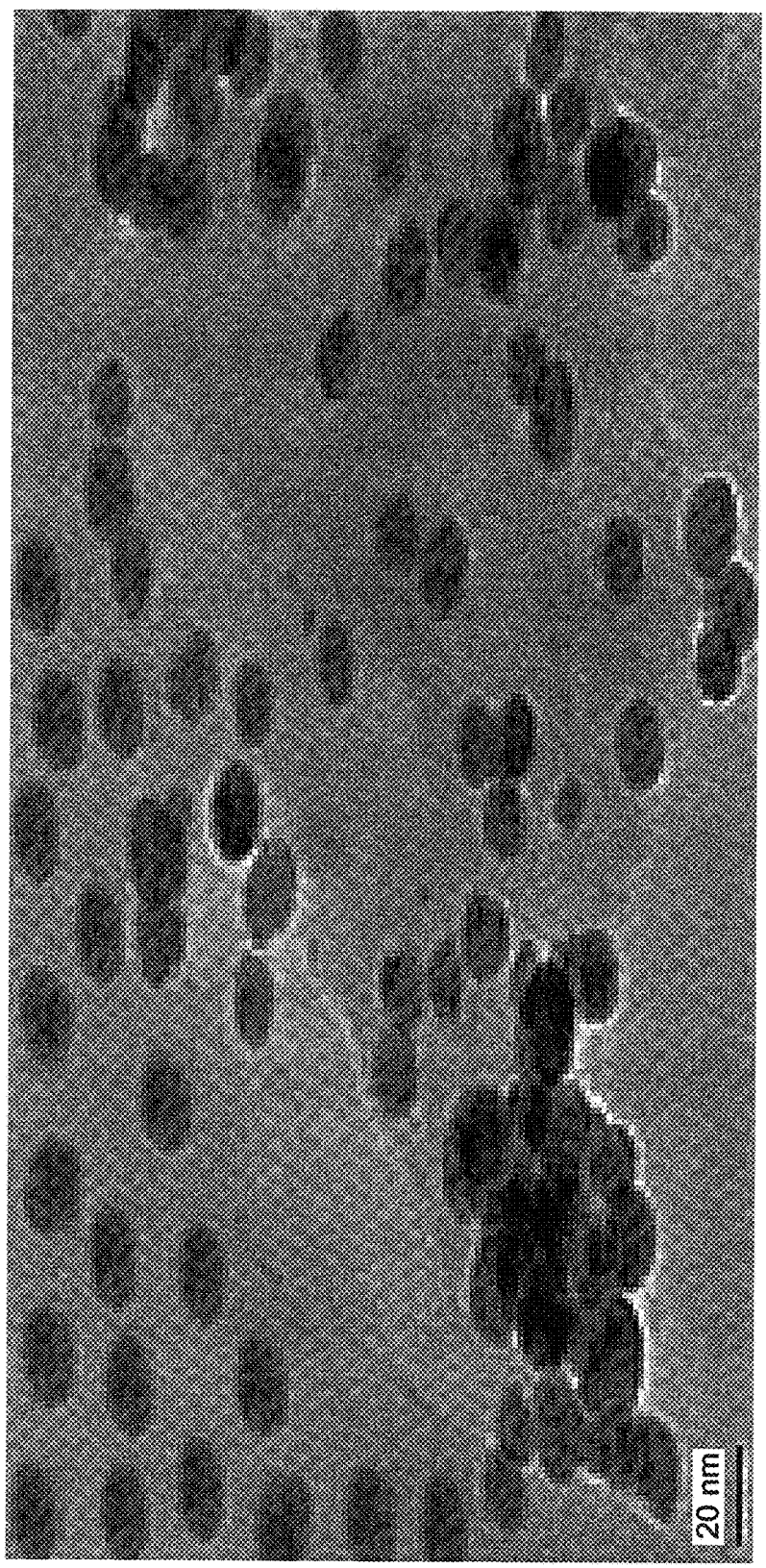
FIG. 10B shows the TEM micrograph of $Cu_2O.2Fe_3O_4$ (Example 3).
Figure 11B:
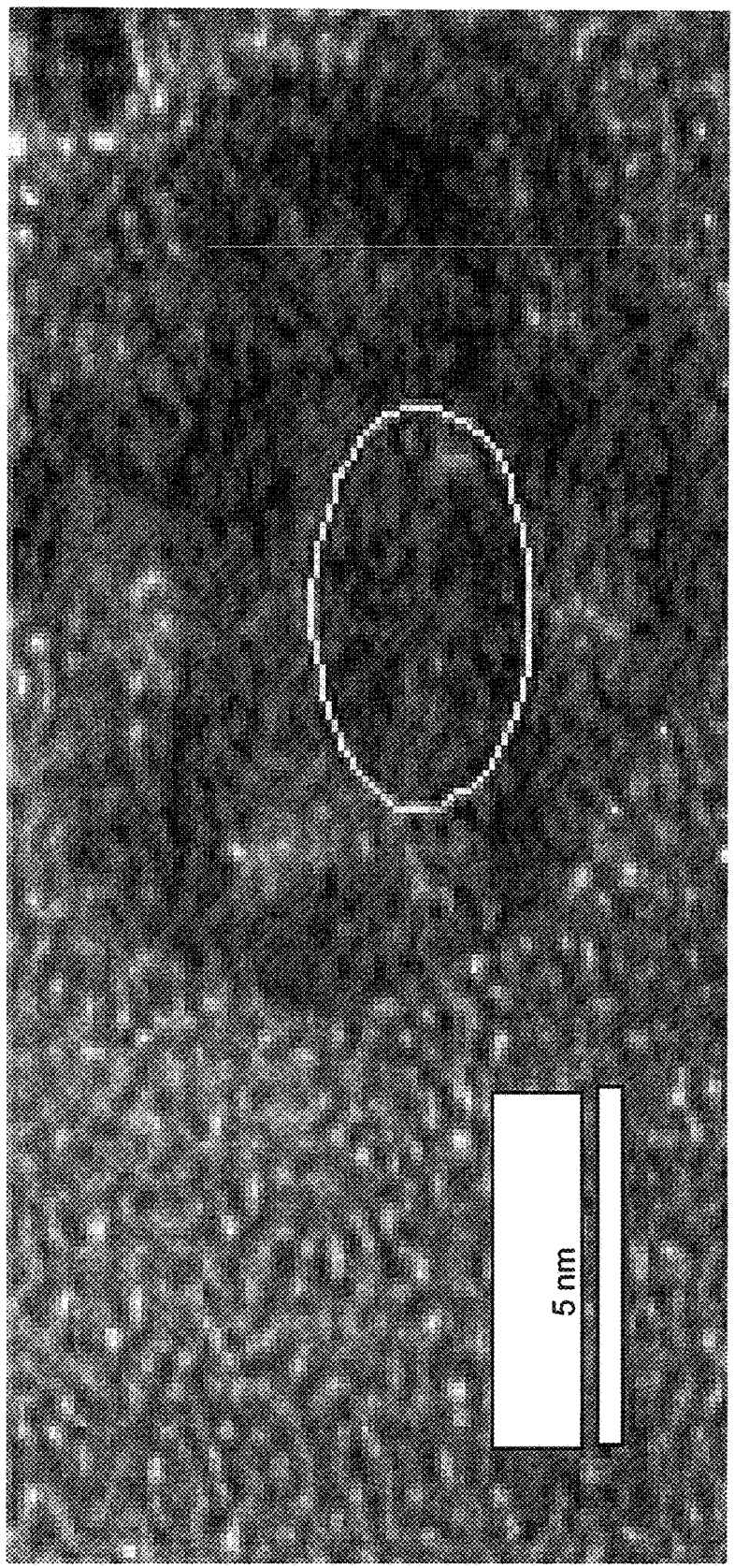
FIGS. 11B and 11D show the HRTEM micrographs of $Cu_2O.2Fe_3O_4$ (Example 3).
Figure 11C:
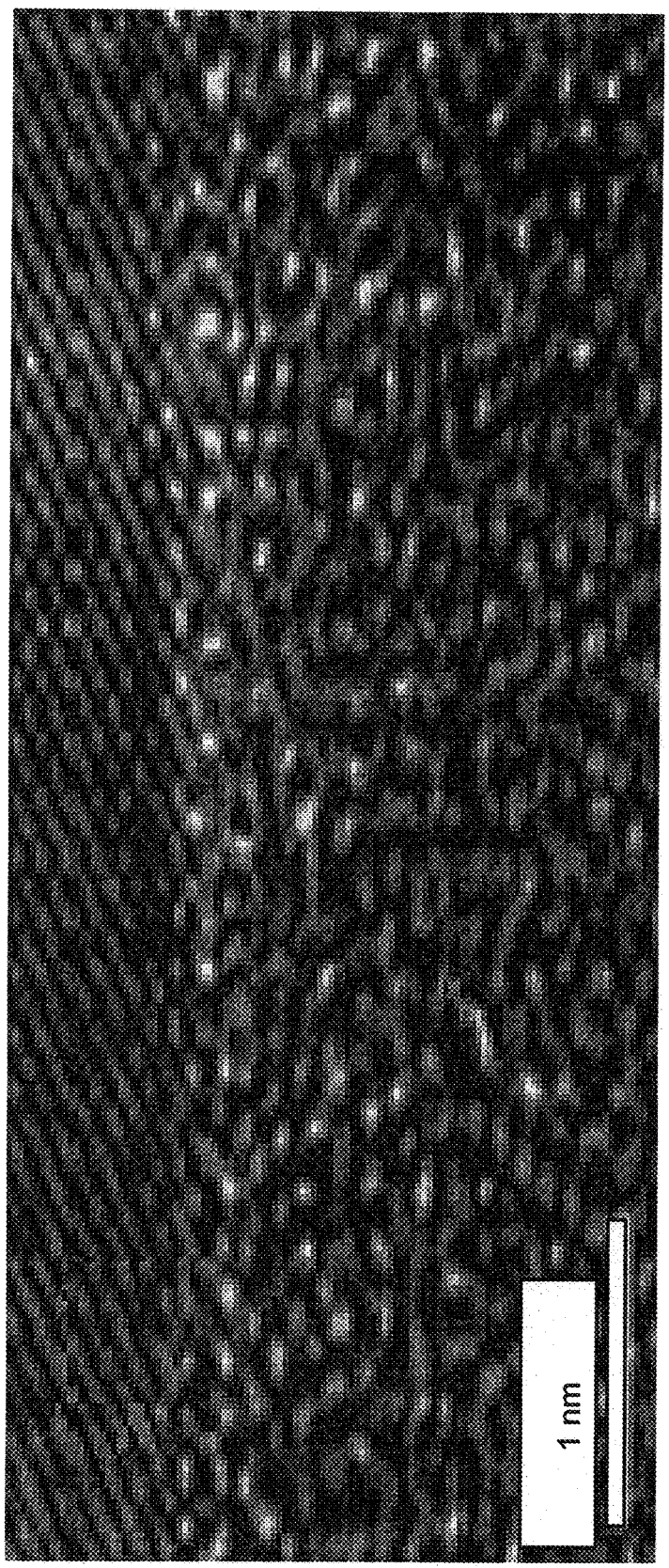
Figure 11D:
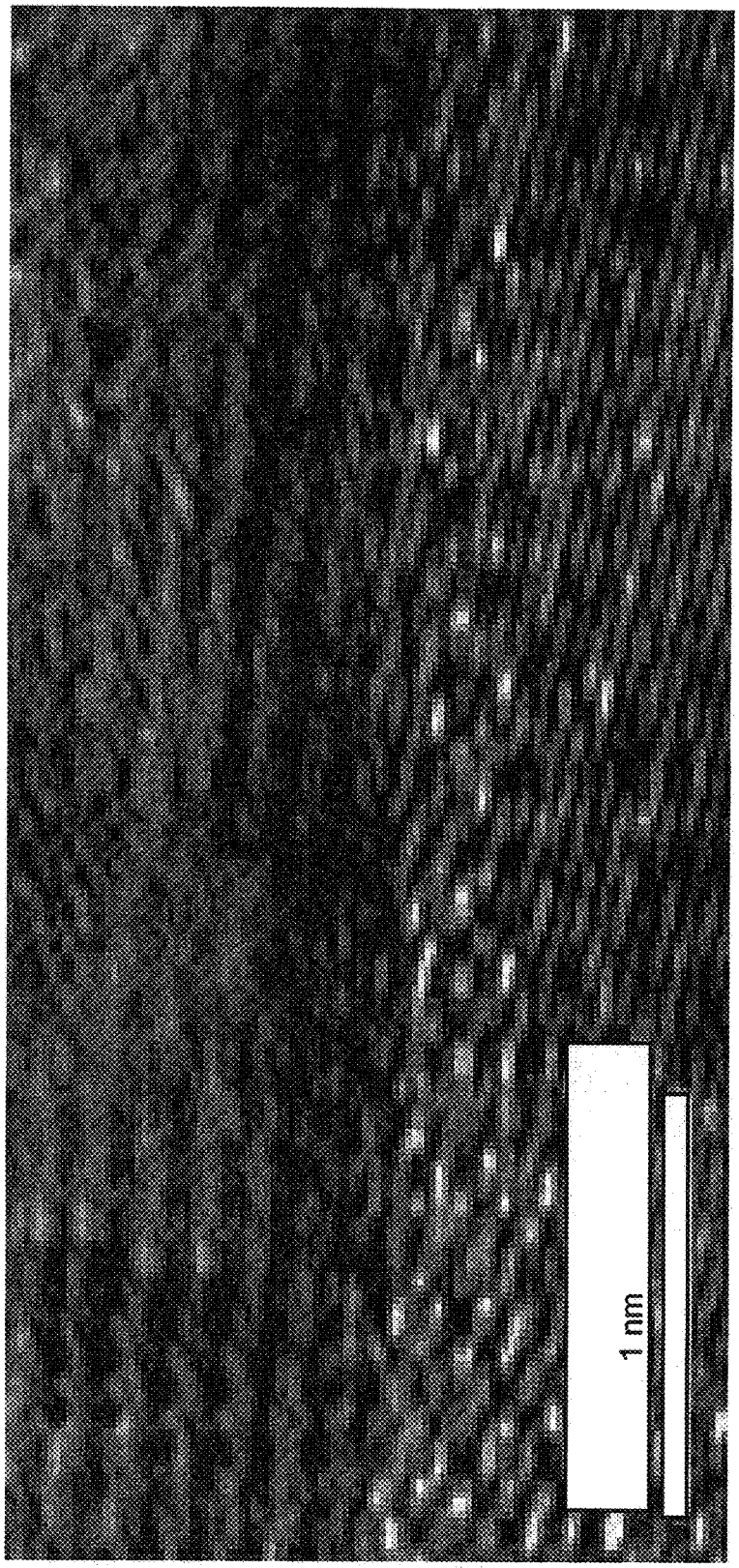

The surface morphologies of $Cu_2O.2Fe_3O_4$ nanocomposites can be determined by SEM and TEM analyses. SEM of $Cu_2O.2Fe_3O_4$ nanocomposites are represented in FIGS. 9A and 9B. The TEM micrographs of $Cu_2O.2Fe_3O_4$ nanocomposites are illustrated in FIGS. 10A and 10B. High resolution TEM micrographs are used to confirm the porosity and arrangement of $Cu_2O.2Fe_3O_4$ nanocomposites as represented in FIG. 11A-D. SEM images of $Cu_2O.2Fe_3O_4$ nanocomposites prepared in absence of AMPSA/VP (FIG. 9A; Example 2) showed different shapes with different particle sizes as the smaller ones with 10-30 nm size belong to the $Fe_3O_4$ nanospheres and the bigger particles with 35-300 nm belong to the rhombic dodecahedral $Cu_2O$, which is confirmed by TEM of (FIG. 10A). SEM and TEM images of $Cu_2O.2Fe_3O_4$ nanocomposites prepared in the presence of AMPSA/VP (Example 3) represented in FIGS. 9B and 10B confirms the even distribution of small $Fe_3O_4$ nanospheres and $Cu_2O$ nanocrystals as appeared as black dots. The bright color in FIG. 10B that surrounds the $Cu_2O.2Fe_3O_4$ nanocomposites elucidates the presence of AMPSA/VP as a shell for encapsulation of $Cu_2O.2Fe_3O_4$ and confirms the proposed structure in FIG. 2. The HRTEM image of the $Cu_2O.2Fe_3O_4$ nanocomposites and the enlarged view of the crystal structures of $Cu_2O.2Fe_3O_4$ confirms the regular distribution of $Cu_2O.2Fe_3O_4$ crystal with porous structure (FIGS. 11B and D) when AMPSA/VP is used to prepare $Cu_2O.2Fe_3O_4$ nanocomposites.

Figure 12A:
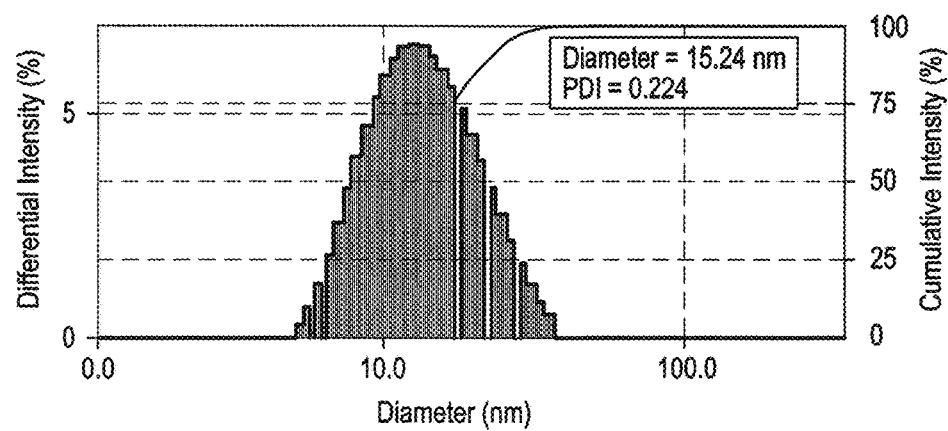
FIG. 12A shows the DLS measurements of $Cu_2O.2Fe_3O_4$ (Example 3) in aqueous solution using 0.001 M KCl at 25° C.
Figure 12B:
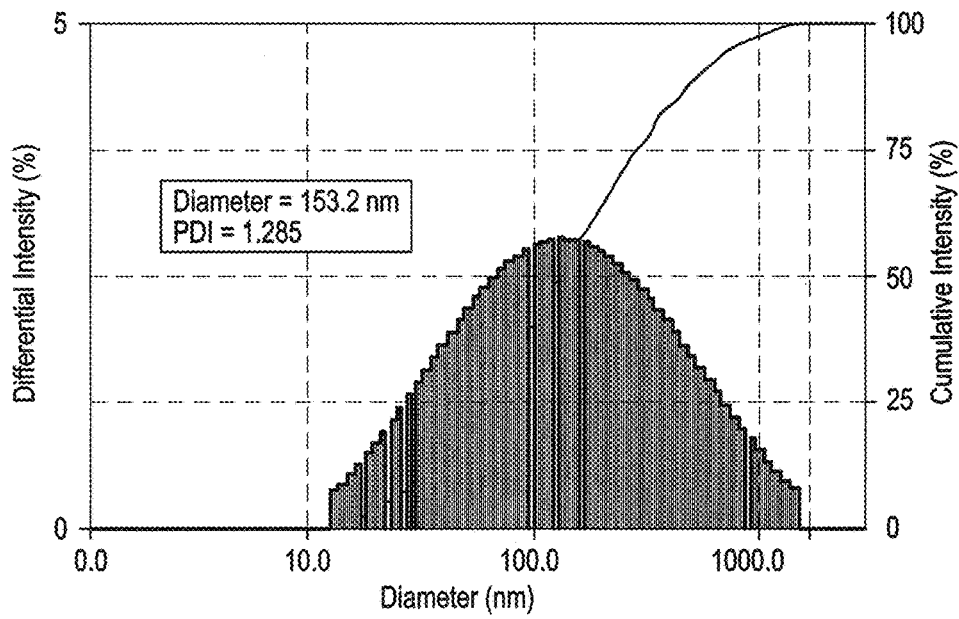
FIG. 12 B shows DLS measurements of $Cu_2O.2Fe_3O_4$ (Example 2) in aqueous solution using 0.001 M KCl at 25° C.

The DLS measurements of $Cu_2O.2Fe_3O_4$ nanocomposites were represented in FIGS. 12A and 12B. The hydrodynamic average particle sizes and polydispersity index (PDI) of $Cu_2O.2Fe_3O_4$ nanocomposites capped with AMPSA/VP are 15.24 nm and 0.224 nm, respectively (FIG. 12A). The DLS measurements of $Cu_2O.2Fe_3O_4$ nanocomposites prepared in absence of AMPSA/VP (FIG. 12B) determined the hydrodynamic average particle sizes and PDI as 153.2 nm and 1.285, respectively. The DLS confirmed that monodisperse $Cu_2O.2Fe_3O_4$ nanocomposites were prepared in the presence of AMPSA/VP poly(ionic liquid).

Figure 13A:
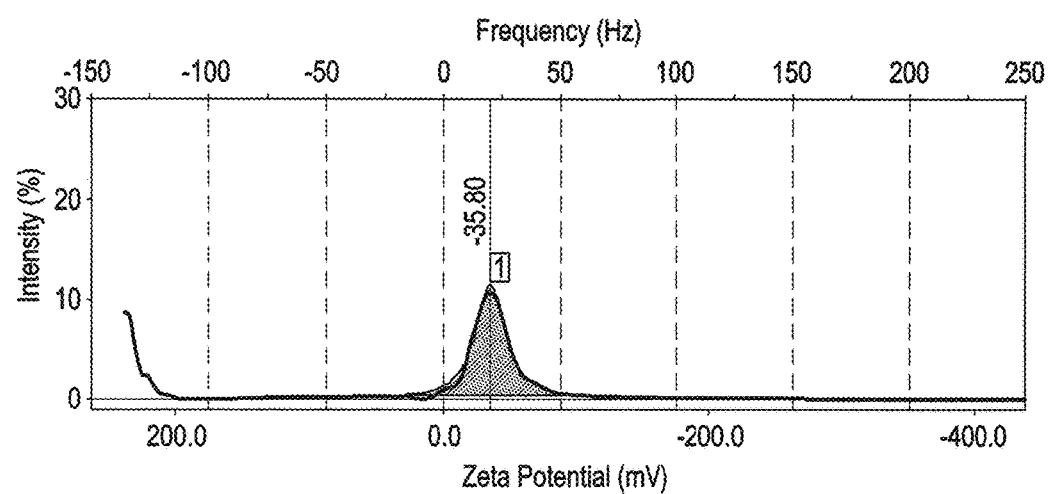
FIG. 13A is a graph showing Zeta potential measurements of $Cu_2O.2Fe_3O_4$ (Example 3) in aqueous solution at 25° C.
Figure 13B:
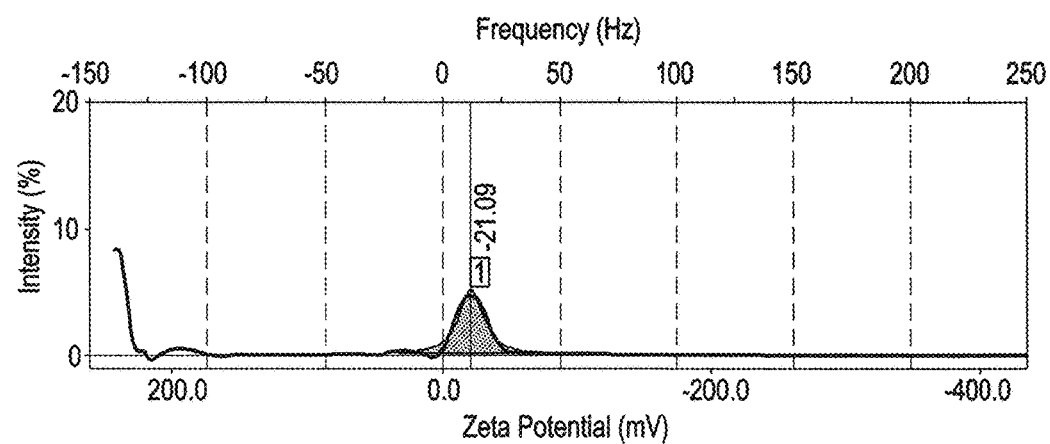
FIG. 13B is a graph showing Zeta potential measurements of $Cu_2O.2Fe_3O_4$ (Example 2) in aqueous solution at 25° C.

The zeta potentials of the dispersed $Cu_2O.2Fe_3O_4$ nanocomposites was represented in FIGS. 13A and 13 B. It was determined that the $Cu_2O.2Fe_3O_4$ nanocomposites capped with AMPSA/VP showed good dispersion stability against aggregation due to their large zeta potential (−35.8 mV). The potential of $Cu_2O.2Fe_3O_4$ nanocomposites prepared in absence of PIL (Example 2) was less negative and determined as −21.09 mV (FIG. 13B). These data confirm the formation of uniform monodisperse $Cu_2O.2Fe_3O_4$ nanocomposites with high charges are less likely to aggregate or form clusters when AMPSA/VP is used as capping and reducing agent.

Epoxy resins cured with polyamine or polyamide hardeners showed good adhesion with steel due to the formation of networks containing ether and hydroxyl groups. There are some microholes or microcracks produced from heat curing exotherms or due to the physical force interactions such as van der Waals occurring between the epoxy matrix and which forms a channel affecting the coat performances as anticorrosive coatings. The dispersability of additives in epoxy matrix is the most important parameter that is used to overcome the formation of cracks or holes. In the present method, $Cu_2O.2Fe_3O_4$ nanocomposites are used as additives for epoxy matrix. The $Cu_2O.2Fe_3O_4$ nanocomposites having different weight percentages ranged from 0.1 to 5 (wt. % based on total weight of epoxy resin and hardener) are dispersed in epoxy resins and cured with polyamide hardener as illustrated in the experimental section. The blank sample of cured epoxy resins without $Cu_2O.2Fe_3O_4$ nanocomposites shows holes and microcracks at the epoxy coat surfaces. The dispersion of $Cu_2O.2Fe_3O_4$ nanocomposites prepared with Example 3 was better than that prepared by Example 2 due to more negative zeta potential in the presence of AMPS/VP (FIG. 13). The epoxy network can be bonded with the $Cu_2O.2Fe_3O_4$ nanocomposites surface via either hydrogen bonding with or polar interactions between charged surfaces of $Cu_2O.2Fe_3O_4$ nanocomposites and hydroxyl or amide groups of cured epoxy matrix to coat porous spaces for volume expansion of cured epoxy surfaces. It was expected that the $Cu_2O.2Fe_3O_4$ nanocomposites atoms having 3d empty orbit can be easily bonded with p orbit of active oxygen atoms of hydroxyl groups of cured epoxy curing, providing enough active oxygen atoms with electrons to form p-d conjugative effect.

The adhesion of epoxy resins with steel substrate using pull-off resistance tester was determined and are provided in Tables 1 and 2. The data confirm the increment of adhesion between epoxy composites with increment of $Cu_2O.2Fe_3O_4$ nanocomposites contents and steel substrate. The incorporation of $Cu_2O.2Fe_3O_4$ nanocomposites into epoxy matrix did not show any significant improvement in adhesion values. These data can be referred to the increment of attraction forces between the negative charges on the surfaces of $Cu_2O.2Fe_3O_4$ nanocomposites and positive charges of steel which alters by nanogel accumulation. The improvement of mechanical properties of $Cu_2O.2Fe_3O_4$ nanocomposites such as impact resistance, hardness and abrasion resistance (Tables 1 and 2) confirms the good interactions between epoxy and $Cu_2O.2Fe_3O_4$ nanocomposites. This observation elucidates that formation of $Cu_2O.2Fe_3O_4$ nanocomposites networks improves the ability of epoxy coat to absorb both the abrasion and impact forces.

The anticorrosion performance of epoxy coats on steel substrate can be examined by salt spray resistance test as summarized in Tables 3 and 4 and illustrated in FIGS. 12 and 13. The features the results are tested from the appearance of epoxy blistering and steel rust under epoxy films. The data confirm no osmotic blisters appeared in epoxy film but the rust increased more for blank film that was not blended with $Cu_2O.2Fe_3O_4$ nanocomposites. The data (Tables 3, 4) elucidate that the epoxy embedded with $Cu_2O.2Fe_3O_4$ nanocomposites achieved high salt spray resistance for 1000 h than other composites while the blank failed after 300 h. This can be referred to the higher dispersion efficiency of $Cu_2O.2Fe_3O_4$ nanocomposites into epoxy matrix forms protective film at the epoxy surfaces prevents the diffusion of water or salts to react with steel surfaces. The negative surface charge increases the interaction between $Cu_2O.2Fe_3O_4$ nanocomposites and epoxy matrix and hence their protection properties increased. Careful inspection of data proves that $Cu_2O.2Fe_3O_4$ nanocomposites at low content can act as self-healing materials at low concentrations. It was noticed that no rust formed at X-cut using low $Cu_2O.2Fe_3O_4$ nanocomposites. This behavior can be due to the high salt resistivity of $Cu_2O.2Fe_3O_4$ nanocomposites which assists in increasing the diffusion of nanoparticles at X cut (defected area).

TABLE 1

Mechanical test of the cured Epoxy $Cu_2O•2Fe_3O_4$ nanocomposites.

| $Cu_2O•2Fe_3O_4$ nanocomposites (Example 2) | Hardness (Newton) | Adhesion (pull off resistance) MP | T-bend | Impact (Joule) | Abrasion Resistance weight loss (mg) |
|---|---|---|---|---|---|
| 0 | 3 | 5 | pass | 5 | 65 |
| 0.1 | 7 | 7 | pass | 8 | 19 |
| 1.0 | 10 | 8 | pass | 10 | 14 |
| 5.0 | 14 | 10 | pass | 12 | 10 |

TABLE 2

Mechanical test of the cured Epoxy $Cu_2O•2Fe_3O_4$ nanocomposites

| $Cu_2O•2Fe_3O_4$ nanocomposites (Example 3) | Hardness (Newton) | Adhesion (pull off resistance) MP | T-bend | Impact (Joule) | Abrasion Resistance weight loss (mg) |
|---|---|---|---|---|---|
| 0 | 3 | 5 | pass | 5 | 65 |
| 0.1 | 5 | 12 | pass | 10 | 12 |

TABLE 2-continued

Mechanical test of the cured Epoxy $Cu_2O \cdot 2Fe_3O_4$ nanocomposites

| $Cu_2O \cdot 2Fe_3O_4$ nanocomposites (Example 3) | Hardness (Newton) | Adhesion (pull off resistance) MP | T-bend | Impact (Joule) | Abrasion Resistance weight loss (mg) |
|---|---|---|---|---|---|
| 1.0 | 8 | 14 | pass | 13 | 9 |
| 5.0 | 10 | 17 | pass | 17 | 4 |

TABLE 3

Salt spray resistance of epoxy $Cu_2O \cdot 2Fe_3O_4$ nanocomposites.

| $Cu_2O \cdot 2Fe_3O_4$ nanocomposites | Disbonded area | | Rating Number |
|---|---|---|---|
| (Example 2) | cm$^2$ | % | (ASTM D1654) |
| Blank | 16.5 | 9 | 6 |
| 0.1 | 1.6 | 1 | 9 |
| 1.0 | 0.1 | 0.01 | 10 |
| 5.0 | 10 | 5 | 7 |

TABLE 4

Salt spray resistance of epoxy $Cu_2O \cdot 2Fe_3O_4$ nanocomposites

| $Cu_2O \cdot 2Fe_3O_4$ nanocomposites | Disbonded area | | Rating Number |
|---|---|---|---|
| Method 3 | cm$^2$ | % | (ASTM D1654) |
| Blank | 16.5 | 9 | 6 |
| 0.1 | 1.6 | 1 | 9 |
| 1.0 | 0.1 | 0.01 | 10 |
| 5.0 | 0.1 | 0.01 | 10 |

Figure 14:
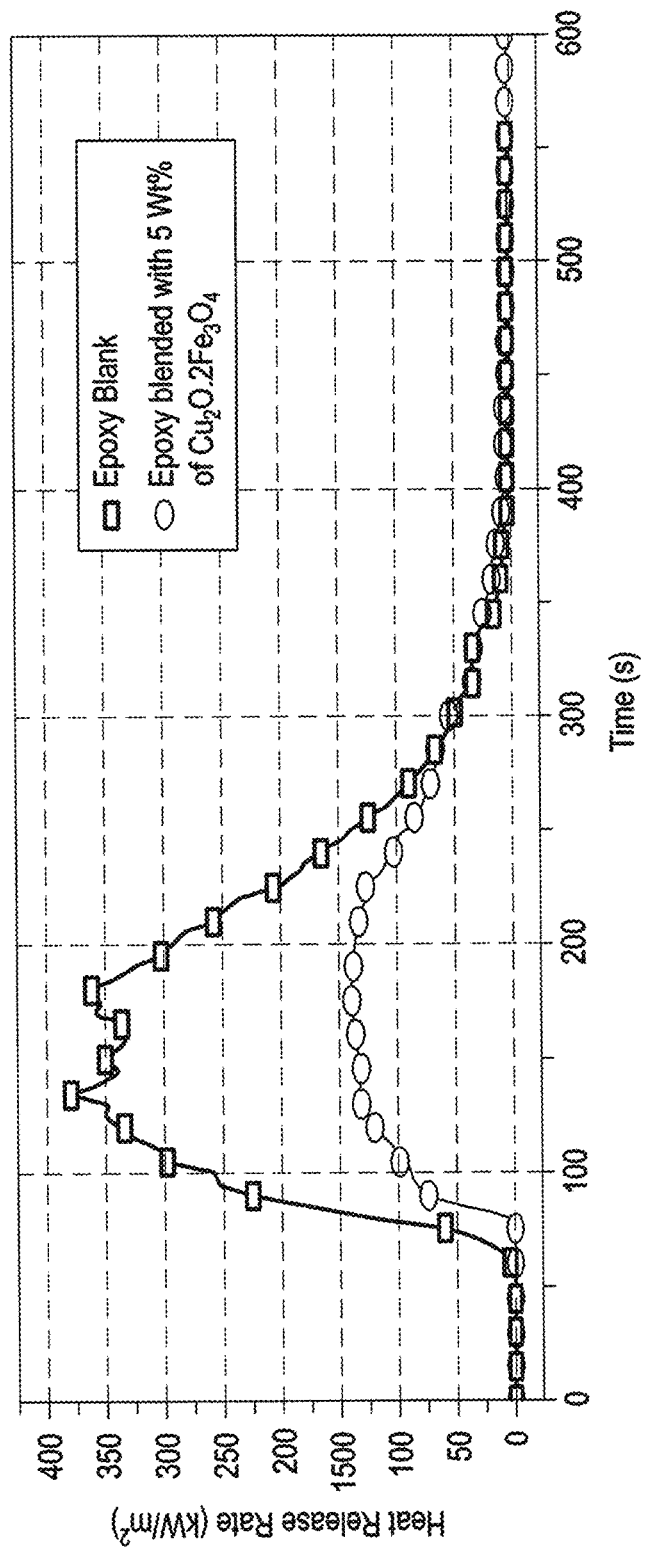
FIG. 14 is a graph showing the heat release rate curve of epoxy and its blend with 5 wt. % of $Cu2O.2Fe_3O_4$ nanocomposites prepared using Example 3.
Figure 15:
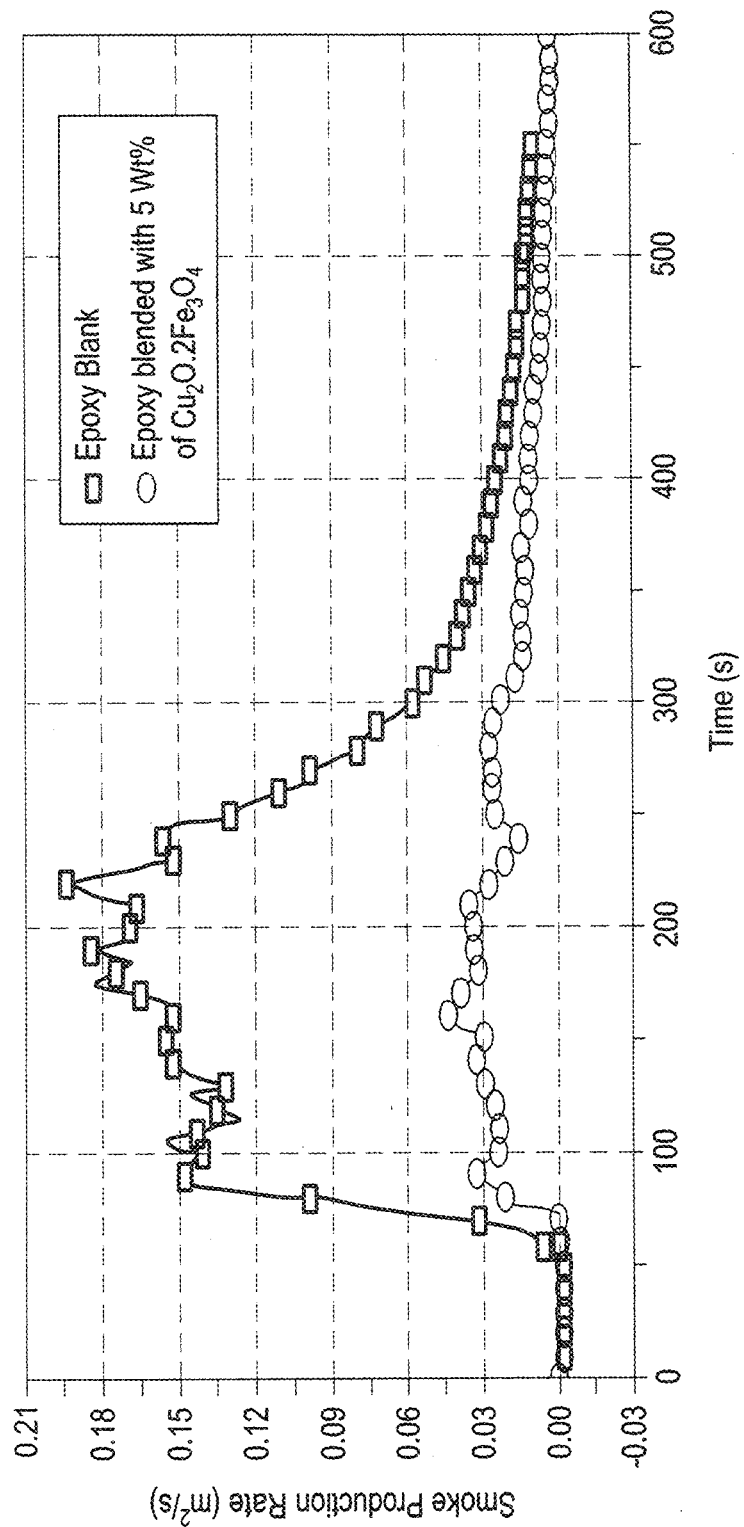
FIG. 15 shows the smoke production rate curve of epoxy and its blend with 5 wt. % of $Cu_2O.2Fe_3O_4$ nanocomposites prepared using Example 3.

Cone calorimeter measurement is used for assessing the fire behavior of materials. It is used to determine the flammability of materials by investigating parameters, such as heat release rate and smoke production rate. The curves of epoxy blank and epoxy blend with 5 wt. % of $Cu_2O.2Fe_3O_4$ nanocomposites prepared as described in Example 3 are shown in FIGS. 14 and 15. The data confirm that the presence of $Cu_2O.2Fe_3O_4$ nanocomposites form a protective layer which hindered the decomposition of epoxy resin by reducing both heat release rate and smoke production rate. Moreover, the time of ignition of epoxy increased when it was blended with 5 wt. % of $Cu_2O.2Fe_3O_4$ nanocomposites. This illustrated that 5 wt. % of $Cu_2O.2Fe_3O_4$ nanocomposites could as fire retardant for epoxy coatings and further enhance the epoxy fire safety. FIG. 15 shows that the addition of 5 wt. % of $Cu_2O.2Fe_3O_4$ nanocomposites could further decrease the smoke production rate of epoxy resins. It can be ascribed to the promotion of formation of a compact intumescent char layer on epoxy surface by $Cu_2O.2Fe_3O_4$ nanocomposites.

It is to be understood that the present invention is not limited to the embodiments described above but encompasses any and all embodiments within the scope of the following claims.

We claim:

1. A method of synthesizing bimetallic oxide nanocomposites comprising the steps of:
    providing a first metal salt solution
    adding an oxidizing agent to the first metal salt solution while degassing the first metal salt solution with an inert gas;
    heating the first metal salt solution to a temperature ranging from about 40° C. to about 65° C.;
    adding a second metal salt solution to the heated first metal salt solution to form a reaction mixture;
    adding a solution comprising a poly (ionic liquid) to the reaction mixture;
    adding a first base dropwise into the reaction mixture for about 1 hour;
    adding a second base to the reaction mixture while stirring and maintaining temperatures ranging from about 40° C. to about 65° C. for at least 2 hours to provide a solution including the bimetallic oxide nanocomposites as precipitate.

2. The method of synthesizing bimetallic oxide nanocomposites according to claim 1, further comprising the steps of:
    separating the precipitate by centrifuging at 15000 rpm for about 10 minutes to isolate the bimetallic oxide nanocomposites; and
    washing the bimetallic oxide nanocomposites with distilled water.

3. The method of synthesizing bimetallic oxide nanocomposites according to claim 1, wherein the oxidizing agent is sodium sulfite ($Na_2SO_3$).

4. The method of synthesizing bimetallic oxide nanocomposites according to claim 1, wherein the first metallic salt solution includes $FeCl_3$, the second metallic salt solution includes $CuCl_2$ and the bimetallic oxide nanocomposites include $Cu_2O.2Fe_3O_4$.

5. The method of synthesizing bimetallic oxide nanocomposites according to claim 1, wherein the poly (ionic liquid) is selected from the group consisting of poly (2-acrylamido-2-methyl-1-propanesulfonic acid-diethyl ethanolamine (PAMPS-DEA), 2-acrylamido-2-methyl-1-propanesulfonic acid-N-isopropyl acrylamide (AMPS-NIPAm), 2-acrylamido-2-methyl-1-propanesulfonic acid-vinyl pyrrolidone (AMPS-VP), and 2-acrylamido-2-methyl-1-propanesulfonic acid-acrylic acid (AMPS-AA).

6. The method of synthesizing bimetallic oxide nanocomposites according to claim 1, wherein the first base is sodium hydroxide and the second base is ammonium hydroxide.

* * * * *